(12) United States Patent
Murphy

(10) Patent No.: US 8,511,335 B2
(45) Date of Patent: Aug. 20, 2013

(54) HEAT TRANSFER REDUCTION APPARATUS

(76) Inventor: Teresa G. Murphy, Littleton, CO (US)

(*) Notice: Subject to any disclaimer, the term of this patent is extended or adjusted under 35 U.S.C. 154(b) by 743 days.

(21) Appl. No.: 12/763,086

(22) Filed: Apr. 19, 2010

(65) Prior Publication Data

US 2011/0253351 A1    Oct. 20, 2011

(51) Int. Cl.
E03B 7/10 (2006.01)

(52) U.S. Cl.
USPC ........... 137/375; 137/294; 137/296; 137/301; 165/135; 165/136; 165/157; 239/13; 239/55

(58) Field of Classification Search
USPC ................. 137/375, 301, 294, 296; 165/135, 165/136, 157; 239/13, 55
See application file for complete search history.

(56) References Cited

U.S. PATENT DOCUMENTS

| | | | | |
|---|---|---|---|---|
| 2,078,606 A * | 4/1937 | Le Grand | ........... | 137/375 |
| 2,985,552 A * | 5/1961 | Watanabe | ........... | 150/156 |
| 3,556,158 A * | 1/1971 | Schneider | ........... | 138/149 |
| 3,724,491 A * | 4/1973 | Knudsen et al. | ........... | 137/375 |
| 3,941,159 A | 3/1976 | Toll | | |
| 4,071,043 A * | 1/1978 | Carlson | ........... | 137/375 |
| 4,103,701 A * | 8/1978 | Jeng | ........... | 137/375 |
| 4,142,565 A | 3/1979 | Plunkett, Sr. | | |
| 4,207,918 A * | 6/1980 | Burns et al. | ........... | 137/375 |
| 4,259,981 A * | 4/1981 | Busse | ........... | 137/375 |
| 4,556,082 A * | 12/1985 | Riley et al. | ........... | 137/375 |
| 4,562,857 A * | 1/1986 | Ball | ........... | 137/375 |
| D293,703 S * | 1/1988 | Kaye | ........... | D23/249 |
| 4,807,669 A * | 2/1989 | Prestidge, Sr. | ........... | 138/178 |
| 4,925,605 A * | 5/1990 | Petronko | ........... | 264/46.6 |
| 5,713,394 A * | 2/1998 | Nygaard | ........... | 138/149 |
| 5,878,776 A * | 3/1999 | Love | ........... | 137/375 |
| 6,079,439 A * | 6/2000 | Hartley | ........... | 137/377 |
| 6,206,030 B1 | 3/2001 | Barthuly | | |
| 6,244,290 B1 * | 6/2001 | Reicin et al. | ........... | 137/312 |
| 6,311,710 B1 * | 11/2001 | Facas et al. | ........... | 137/1 |
| 6,520,201 B2 | 2/2003 | Sweeney et al. | | |
| 6,634,390 B2 * | 10/2003 | Toth | ........... | 138/146 |
| 6,820,639 B2 | 11/2004 | Petschek | | |
| 6,907,907 B2 * | 6/2005 | Maida | ........... | 138/149 |
| 6,921,564 B1 * | 7/2005 | Keenan | ........... | 428/36.91 |
| 7,100,633 B2 * | 9/2006 | Lechuga | ........... | 137/375 |
| 7,757,722 B1 * | 7/2010 | Lesch et al. | ........... | 138/149 |
| 7,784,547 B2 * | 8/2010 | Reddy | ........... | 166/360 |
| 2008/0099078 A1 * | 5/2008 | Heatwole | ........... | 137/375 |

\* cited by examiner

*Primary Examiner* — John K Fristoe, Jr.
*Assistant Examiner* — Minh Le
(74) *Attorney, Agent, or Firm* — Roger A. Jackson

(57) ABSTRACT

A heat transfer reduction apparatus and method for an article is disclosed that includes a first surrounding sidewall having a first base and an opposite first closure. The first sidewall, base, and closure all define a first interior, wherein a portion of the first sidewall is in contact with a first portion of the article. Also, a second surrounding sidewall that has a second base and an opposite second closure. The second sidewall, base, and closure all define a second interior, wherein a portion of the second sidewall is in contact with a second portion of the article. Further, a moldable insulating material is disposed within the first and second interiors. The first and second sidewalls form a separable clamshell interface to one another forming about the article first and second portions. Also included is structure for retaining the first and second sidewalls to one another at the clamshell interface.

24 Claims, 22 Drawing Sheets

At rest operational state - Dry
(no water pressure present)

Sprinkler on state - Wet
Water flowing from municipal
Water supply to sprinkler heads Backflow state from sprinklerhead
Municipal water supply off Properly winterized
At rest-operational state - Dry
(no water pressure present)

Municipal water supply side - frozen water in valve
Failure operational state
(no water pressure present)

Municipal water supply side – after frozen water in valve melts
Failure operational state
(no water pressure present)

Baseline Test Setup   Fig.7

Sprinkler valve assembly uncovered - Full of water
Data from Baseline Test Setup Basic Insulated Test Setup    Fig.9

HEAT TRANSFER REDUCTION APPARATUS

RELATED APPLICATIONS

None.

TECHNICAL FIELD

The present invention generally relates to an apparatus for resisting heat transfer by helping to retain heat to an adjacent mass. More particularly, the present invention is an encapsulating enclosure about an assembly of plumbing components that minimizes open air gaps and utilizes a multi layer concept to further resist heat transfer from the assembly of plumbing components to an external environment, while being a self contained apparatus not needing an external heat energy source.

BACKGROUND OF INVENTION

Plumbing components when disposed in the external environment, or as commonly termed "outside" must have some form of protection from the freezing of the fluid disposed within the plumbing components in below freezing weather. As the freezing of the fluid disposed within the plumbing components causes the fluid to typically expand volumetrically and by the nature of being confined within the plumbing components, i.e. piping, valves, elbows, and the like. This freezing fluid can exert outwardly expanding forces as against the internal surfaces of the plumbing components that are quite significant, possibly leading to fracture of the plumbing component sidewall, plate, cap, cover, or other plumbing component(s) which of course can lead to disastrous consequences. Wherein this plumbing component fracture while not only failing the component(s) can potentially allow the pressurized fluid within the plumbing components to be released into the external environment in an uncontrolled manner, hence compromising safety via the fluid being in the external environment along with the economic loss associated therewith.

Looking at particular to the automatic or manual permanently installed lawn sprinkler systems arts, wherein there is usually an "outside" exposed number of plumbing components that typically include piping, on/off ball type valves, smaller ball type bleeding valves, and an anti siphon valve assembly. Thus this is the interface between typically the municipal water supply system and the sprinkler feed/distribution system for the lawn, wherein the siphon valve (usually as per government building codes) prevents any water backflow from the sprinkler feed/distribution system back into the municipal water supply system. Should a reverse pressure situation occur, wherein the sprinkler feed/distribution system would have a higher internal pressure than the municipal water supply system, with the purpose being to prevent contamination of the potable municipal water system from the potentially non-potable contaminates disposed within the sprinkler feed/distribution system.

Usually, if an external environment freezing situation occurs with the water disposed within the exposed sprinkler plumbing components freezing, the weakest structural plumbing component link will rupture when internal force is created as against the internal walls on the exposed plumbing components, which is typically the anti siphon valve which will rupture. As the anti siphon valve normally has the largest surface area exposed to force resulting in the anti siphon valve experiencing the highest stress normally leading to the anti siphon valve fracturing, and unfortunately the anti siphon valve is typically the most expensive component of the exposed sprinkler system plumbing components. However, the anti siphon valve typically being the most physically accessible plumbing component for replacement, as opposed to the adjacent piping or aforementioned valves being more difficult to replace due to their location and/or more permanently affixed nature to the sprinkler system.

Normal procedure for sprinkler systems when the freezing colder weather months are approaching is to turn off the ball valve to the municipal water supply and then drain and in combination with a compressed air blowing out, the sprinkler system downstream of the closed ball valve that is in fluid communication with the municipal water system, wherein the municipal water supply valve is located in a non-freezing area, such as within a heated building or underground below the frost line, typically 3 feet or more below the ground surface. However, in the "real" world not all of the residual water is totally removed from within the sprinkler system, in addition, the external environment weather transfer from non-freezing to freezing weather is not usually a specific point in time during the change of seasons, in that a freezing may be light of hard depending upon how long and how far the outside temperate drops below freezing, also wind, humidity, sun exposure, and the like all play a role and this is coupled with the uncertainty of a first light freeze to hard freeze in the change of seasons.

Other factors related to the physical aspects of water freezing further add to the uncertainty of the water hard freezing point in time, being in the "latent heat of fusion" of the internal water freezing in going from liquid to semi-frozen slush, to being hard frozen solid also depend upon the rate of heat transfer from the water to the external environment. Plus the mass or volume of the water present which affects the "thermal diffusivity" of the specific water volume, all work to add to the uncertainty of when the water will freeze solid, wherein the plumbing component damage can occur, versus the water becoming a semi frozen slush, which will most likely not cause plumbing component damage. The result of all this is that frequently the sprinkler system can still be full of water during a sudden unexpected early freeze near the beginning of the cooler season, or the sprinkler system can be turned off prematurely, wherein the lawn is exposed to a warm dry period extending into the cooler weather season without the benefit of the sprinkler system, causing harm to the lawn. The result is that even with the best of precautions, freezing of the exposed plumbing components of the sprinkler system is very possible.

Thus, for the water contained within the plumbing components to move from a liquid state to a solid thus going to a hard freeze state, a specific amount of heat must be transferred out of the water to the surrounding external environment. This heat transfer occurs via three typical processes, being heat radiation, heat convection, and heat conduction, wherein the heat transfer always going from a warmer source to a cooler source, or in other words a heat transfer in going from the water to the surrounding external environment. Heat transfer radiation occurs without any consideration of a medium of which to transfer the heat in, an example would be the sun radiating heat to the earth wherein the heat transfer occurs through the vacuum of space and through the Earth's atmosphere. Thus, the control of heat transfer radiation as effectuated by the ability to either reflect or absorb the radiation, depending upon the desired outcome wherein reflecting the radiation directs the heat back to its source and absorbing the radiation disposes the heat transfer energy to be within the absorbing medium. A radiation reflection medium would be a highly smooth polished and lightly colored reflective surface as contrasted to a radiation absorption medium that would typically have a rough surface and be dark in color.

In looking at heat transfer convection is where the heat energy is carried within a third medium between a heat source and a cooler external environment, a typical example would be in an automotive internal combustion engine cooling system wherein the antifreeze is the third medium that is pumped in between the cylinder walls of the engine and flows to the radiator that has many small passages for which the heat in the third medium can be transferred into the surrounding atmospheric air, thus heat transfer convection is the most efficient means of heat transfer being typically used where a maximum of heat needs to be transferred within a limited amount of space.

Further, in looking at heat transfer conduction in comparing to heat transfer convection the third medium is removed in the heat transfer is solely by the thermal energy of atomic motion directly through materials that are adjacent to one another. In comparing heat transfer conduction to heat transfer convection, heat transfer conduction allows much less heat transfer to occur and that would thus not be a choice for situation where a high heat transfer were desired.

Thus, in the present invention the goal is to absolutely minimize the amount of heat transfer, therefore the three modes of heat transfer named radiation, convection, and conduction need to each be dealt with independently to minimize the amount of overall heat transfer from the water present within the plumbing components to the surrounding external environment, thus resulting in slowing down the water entering into the hard freezing state even though the surrounding external environment is at a below freezing temperature. Noting from the aforementioned analysis above the primary mode of heat transfer to minimize his convection, as he transfer convection is the most efficient in transferring the maximum out of heat this is the heat transfer mode the must absolutely be minimized, wherein radiation and conduction are also minimized, however, having a less significant effect on minimizing overall heat transfer.

This issue is well-recognized in the prior art wherein there are a number of apparatus that attempt to address the above referenced problem. One prior example is in U.S. Pat. No. 4,142,565 to Plunkett Sr. wherein disclosed is an insulating device for fluid conduit for the transport of fluid at a temperature different from the temperature of the immediately surrounding ambient atmosphere that may be quickly and efficiently protected against thermal transport by an insulating device. The device in Plunkett Sr. comprising an elongating sheet of flexible heat insulating material having a length terminated by a top edge and a bottom edge, having a width slightly greater than the equatorial dimension of the fluid conduit and terminated by a first side edge and a second side edge and having an interior conduit-facing side an exterior side, and means for releasably securing the elongated sheet about the fluid conduit.

Plunkett Sr. is basically a hook and loop fastener attached blanket that loosely envelopes the diversely shaped plumbing components constructed of a neoprene sheet, there is no teaching related to special sheet layering, or radiation heat transfer issues, further, the partially non-adjacent nature of the neoprene sheet to the plumbing components would allow for some degree of convection, all of which would lessen the thermal insulating qualities of the Plunkett Sr. device. Further, Plunkett Sr. fails to address the air gap pocket problem leading to increased convection between the pipe and the cover in heat transfer and also does not address the pipe to ground interface problem for loss of heat of the pipe in a cold environment. Plunkett Sr., is merely a folded over neoprene sheet that sandwiches plumbing components providing a minor degree of thermal insulation as between the environment and the plumbing components.

Continuing in the prior art in looking at U.S. Pat. No. 6,820,639 to Petschek, which is basically the same design as Plunkett Sr., in so far as the sheet sandwiching the plumbing components being attached at the sheet outer edges via a hook and loop fastener. Specifically, Petschek discloses a thermal cover for backflow prevention assemblies of a sprinkler system with a thermally lined top wall, opposed thermally lined side walls, fixedly closed end walls, and a variable shaped bottom opening with the side walls flexing outward to allow the cover to spread apart and fit down over the backflow prevention assembly. An adjustable bottom closure in Petschek is closed and fits around at least one pipe extending through the bottom of the cover to close the bottom opening, also a second embodiment further has variable shaped openings along both opposed end walls to allow pipes connected to the backflow prevention assembly to extend through the ends as well as through the bottom. These end openings in Petschek are selectively opened and closed with adjustable end closures, with this embodiment opening up to a flat blanket like configuration.

Velcro-type co-acting first and second fastening members are disclosed in Petschek as an adjustable closure for both the bottom and sides, plus a disclosed thermal cover protects backflow prevention assemblies in case of a short overnight hard freeze, or during extended periods of ambient air temperatures hovering at or below the freezing mark, see Column 1, lines 54-67, and Column 2, lines 1-8. However, Petschek suffers from the same shortcomings as Plunkett Sr., in so far as the air gap and pipe ground interface as previously discussed that adds to the convection heat transfer, Petschek does address radiation heat loss from the pluming components 13, however, placing a radiation layer in the outer surface, see column 3, lines 5-25, which would not be optimal as the radiation would be minimized due to traveling through the insulation for reflection back to the plumbing components 13.

Further Petschek does not address the significant loss of thermal insulating qualities of the sheet at the hook and loop fastener or Velcro interface areas, see in particular FIG. 2, as the insulating walls 17 and 18, completely disappear at the Velcro interface 38 and 41, leaving the pipe with very little thermal insulation, see FIG. 4, at or near the ground to pipe interface, see FIG. 5. Given that the pipe is usually constructed of copper material, which conducts heat very well, the pipe ground interface in Petschek, see FIG. 5, pipe element 15 would very efficiently conduct heat away from the valves, see element 13 in FIG. 5, to the colder ambient environment, thus greatly lessening the anti-freezing properties of the insulation walls 17 and 18 for the plumbing components 13.

Moving next to U.S. Pat. No. 6,520,201 to Sweeney et al. disclosed is an insulated backflow device cover comprising a flexible outer cover, an insulated bag removably attached inside the outer cover such that the outer cover and insulated bag define an interior cavity. Further included in Sweeney et al., is a sealing structure attached to the insulated bag and positioned so as to removably seal the interior cavity of the insulated bag about the fluid transport system, and a plurality of securing structures interconnecting the outer cover and the insulated bag so as to removably secure the device to the region of the fluid transport system. In another aspect of the Sweeney et al., invention, the device includes at least one layer of radiant barrier material and at least one layer of air retaining material.

In one alternative aspect in Sweeney et al., the radiant barrier material and air retaining material are placed in alternating layers. In another alternative aspect of Sweeney et al., the radiant barrier material and air retaining material are placed in alternating layers with the device being made of materials that are unattractive nesting or food materials to animals, birds, insects, plants, or fungi. The materials in Sweeney et al. also absorb less than 20% by weight of water are resistant to exposure to sunlight and temperature extremes; see Column 2, lines 7-32. Sweeney et al. is similar to Petschek in general configuration and thus also has the same previously discussed drawbacks, however, Sweeney et al. does have the layered configuration in materials for more heat transfer efficiency and recognizes the importance of blocking or reducing radiation heat transfer by virtue of the reflective barrier foil.

However, Sweeney et al., as previously mentioned has Petschek's loose fitting and air gap space issues in conjunction with not having an effective pipe/ground interface heat transfer insulation, see FIGS. 1 and 2, which expose the high heat transfer piping (being usually constructed of copper) to the surrounding external environment that will act to accelerate the heat loss from the piping components to the surrounding external environment along with the potentially circulating air gap around the piping components that will further the undesirable increase in heat transfer from the piping components to the surrounding external environment. In summary, Sweeney et al., has a better insulating cover than Petschek for the cover itself, however, still lacks in the air gap and pipe/ground interface areas as described.

Further, in the heat transfer restriction prior art area in U.S. Pat. No. 6,206,030 to Barthuly, disclosed is an insulating cover for water backflow prevention apparatus in the nature of a pillow slip made of thermal insulating material, preferably with a waterproof outside surface and a heat-reflecting inside surface. The cover in Barthuly has an open bottom end like a pillow slip but with a closed hem containing a relatively dense liquid or fluid-like solid granular or pelletized or powered material surrounding the bottom opening. The cover in Barthuly is foldable flat or in any desired configuration for storage. To cover the backflow preventer apparatus in Barthuly, according to the method of the invention, the cover is installed open end down, over the backflow prevention apparatus, and the entire perimeter of the lower edge is engaged with the ground surface.

The fill material in Barthuly, being heavy, holds the cover down on the ground and, being fluid-like, enables the perimeter of the open end to engage the contour of the ground throughout the perimeter to provide an effective cover-to-ground seal. Apertured tabs in Barthuly are provided at the hem to enable installation of anchor stakes, if desired, see column 2, lines 6-26. Barthuly takes into consideration the issue of the pipe interface with the ground heat transfer problem previously described by adding a flanged heavier ground interface that can accommodate an uneven ground surface, see FIG. 1, however, still having the air gap heat transfer problem as previously described, only at an even greater extent as the air gap volume is significantly more than Petschek and Sweeney et al., providing a greater volume of air to undesirably absorb heat away from the piping components, thus potentially freezing the water disposed within the plumbing components sooner.

Continuing in the heat transfer reduction prior art in U.S. Pat. No. 3,941,159 to Toll disclosed an insulation assembly only for a tubular conduit pipe wherein the material is water and vapor proof, corrosion resistant, and flame retardant, it requires no adhesive or banding. The fabric covering in Toll may be supplied in various colors if desired, to permit color identification of different pipeline services, see column 1, lines 53-57. A length of insulation material in Toll is wrapped about an article to be insulated. A layer of fabric is affixed in Toll to the insulation material, one end of the fabric being of a length to overlap the opposite end thereof. Fastening means in Toll are on the overlapped ends of the fabric provide a secure connection of the fabric about the insulation material. Toll shows the key issue of "adjacent" i.e. no undesirable air gap between the pipe and the cover insulating material to the pipe outer diameter; however, Toll does not address the convoluted configuration issue of having a multitude of plumbing components such as valves, siphons, elbows, and the like, as Toll would not be able to accommodate the desirable no air-gap design about non-symmetrical plumbing components, such as a valve. Further, Toll does not recognize radiation heat transfer as a means for reducing overall heat transfer from the piping outer surface.

There remains a need for a more efficient heat transfer reducing apparatus that can better help prevent freezing of the water in the exposed plumbing components and thus the fracturing failure of typically the anti-siphon valve as previously described. A new more efficient heat transfer apparatus would utilize air-gap volume reducing technology along with multiple layering to help the exposed plumbing components to retain what little heat they have to help keep the water disposed within from freezing, thus preventing the undesirable plumbing component damage as previously described. This air gap volume reducing technology would have to reduce the convective heat transfer, which is the most significant heat transfer to reduce, noting that even minimal amounts of air movement (being less than one mile per hour air velocity) around the plumbing components, resulting from slight air temperature differences around the plumbing components can increase the heat transfer from the water in the plumbing components to the surrounding external environment multitudes of times in comparison to the heat transfer from conduction alone.

Thus reducing this air gap as much as possible to prevent or minimize air flow and to reduce the volumetric mass of air around the plumbing components that is heated by the plumbing components is important to minimizing the overall heat transfer from the water to the surrounding external environment. Reducing this air gap around the oddly shaped plumbing components has two distinct challenges, the first one being that the external surfaces of the multiple plumbing components which are typically piping, elbows, ball shutoff valves, bleed valves, and the anti-siphon water backflow prevention valve are all randomly spaced from one another forming a quite uneven surface, which practically necessitates a custom fitted insulating enclosure around the previously described plumbing components to accommodate the practically infinite variety of plumbing component arrangements spacing and sizing.

The second distinct challenge in reducing this air gap from the custom fitted insulating enclosure, is a the enclosure must be easily removable for the required physical access to all of the previously described valves. Further desirable features on the custom fitted insulating enclosure would for it to be water proof, as water entrainment into the insulation would have a detrimental effect on increasing heat transfer through the insulating enclosure and for it to seal tightly when the custom fitted insulating enclosure is re-attached to the plumbing components. Thus, these two previously mentioned challenges embody the novel requirement of the present invention, as noted in the discussion of the prior art the devices typically are a mere blanket or large pocket of some sort that loosely drapes over the plumbing components, wherein this has the effect of allowing large air gaps in the multitude of places around the plumbing components which facilitates heat transfer convection which leads to higher rate of heat transfer from the water disposed within the plumbing components to the surrounding external environment and the resulting undesirable situation of the water freezing sooner. This would be accomplished with the more efficient heat transfer reducing apparatus without the need of any additional heating elements and the like, resulting in the heat transfer apparatus being "Green" i.e. more energy efficient, not requiring any ongoing energy to operate, thus being totally self contained not requiring for example an electrical heating element to prevent freezing that would need an outside electrical power source.

SUMMARY OF INVENTION

Broadly, the present invention is of a heat transfer reduction apparatus for an article, with the article having a unique convoluted exterior surface. The heat reduction transfer apparatus includes a first flexible surrounding sidewall that has a first base, and an oppositely disposed first closure, further the first surrounding sidewall includes a first sidewall periphery and a perpendicularly oriented first distance as between the first base and the first closure. Wherein the first sidewall, the first base, and the first closure all act to define a first interior, wherein a portion of the first surrounding sidewall is in contact with a first portion of the exterior surface of the article. Further included in the heat transfer reduction apparatus is a second flexible surrounding sidewall that has a second base, and an oppositely disposed second closure, further the second surrounding sidewall includes a second sidewall periphery and a perpendicularly oriented second distance as between the second base and the second closure. Wherein the second sidewall, the second base, and the second closure all act to define a second interior, wherein a portion of the second surrounding sidewall is in contact with a second portion of the exterior surface of the article.

Further included in the heat transfer reduction apparatus is a moldable insulating material disposed within the first interior and the second interior via the first closure and the second closure respectively. Wherein the first surrounding sidewall and the second surrounding sidewall form a separable clamshell interface arrangement to one another about the article exterior surface. Wherein the first surrounding sidewall and the second surrounding sidewall with the moldable insulating material acts to be substantially conforming in a custom manner about the article unique convoluted exterior surface while minimizing any air-gap spaces about the article exterior surface. Additionally, the heat transfer reduction apparatus includes a means for removably retaining the first surrounding sidewall and the second surrounding sidewall to one another in the clamshell arrangement about the article exterior surface.

These and other objects of the present invention will become more readily appreciated and understood from a consideration of the following detailed description of the exemplary embodiments of the present invention when taken together with the accompanying drawings, in which;

BRIEF DESCRIPTION OF DRAWINGS

FIG. 12 shows what is termed a two part rigid polyurethane insulating assembly which includes a separable vertically split clamshell type arrangement to facilitate the needed free access to the plumbing component assembly, wherein each vertically split half is a poured in place two part polyurethane mix with each clamshell half being disposed within a multiple small slit vented plastic bag, thus the two empty clam shell bags are placed about each side of the plumbing component assembly, then the two part polyurethane mix is added to each bag, with the polyurethane mix growing symmetrically within each plastic bag due to the pressure activated venting and then into a rigid closed cell foam insulation having the ability to uniquely mold the rigid closed cell foam insulation around the unique plumbing component assembly to minimize any open air spaces adjacent to the plumbing component assembly with the venting closing after the foam has fully expanded and no pressure is present at the vents, directly adjacent to the siphon valve housing and the ball valve housings is a layer of reflective foil backed by a one-eighth inch layer of flexible closed cell foam that is adhered to each one of the clam shell halves, further in-between the clam shell halves are a plurality of rubber labyrinth seals to enhance sealing as between the clamshell halves, also a flexible cover is placed about both clamshell halves to hold the clam shell halves together with another plurality of rubber labyrinth seals positioned between the cover and the ground surface;

FIG. 13 shows what is termed the full fiberglass insulating assembly which includes a single piece flexible inverted "U" shaped enclosure type arrangement to facilitate the needed free access to the plumbing component assembly, wherein the flexible inverted "U" shaped enclosure contains fiberglass insulation disposed within a multiple small slit vented plastic bag, thus the plastic bag is filled with fiberglass insulation and the bag is bent about each side of the plumbing component assembly as shown, with the pressure activated venting allowing trapped air to escape thus allowing the "U" shaped bag to have its interior filled with fiberglass insulation with the venting closed without the presence of pressure, thus the fiberglass insulation having the ability to flexibly mold itself around the unique plumbing component assembly to minimize any open air spaces adjacent to the plumbing component assembly, directly adjacent to the siphon valve housing and the ball valve housings is a layer of reflective foil backed by a one-eighth inch layer of flexible closed cell foam that is adhered to each side of the inverted "U" shape as shown, also a flexible cover is placed around the inverted "U" shaped bag to hold the inverted "U" shaped bag adjacent to the plumbing component assembly with another plurality of rubber labyrinth seals positioned between the cover and the ground surface;

REFERENCE NUMBERS IN DRAWINGS

Figure 1:
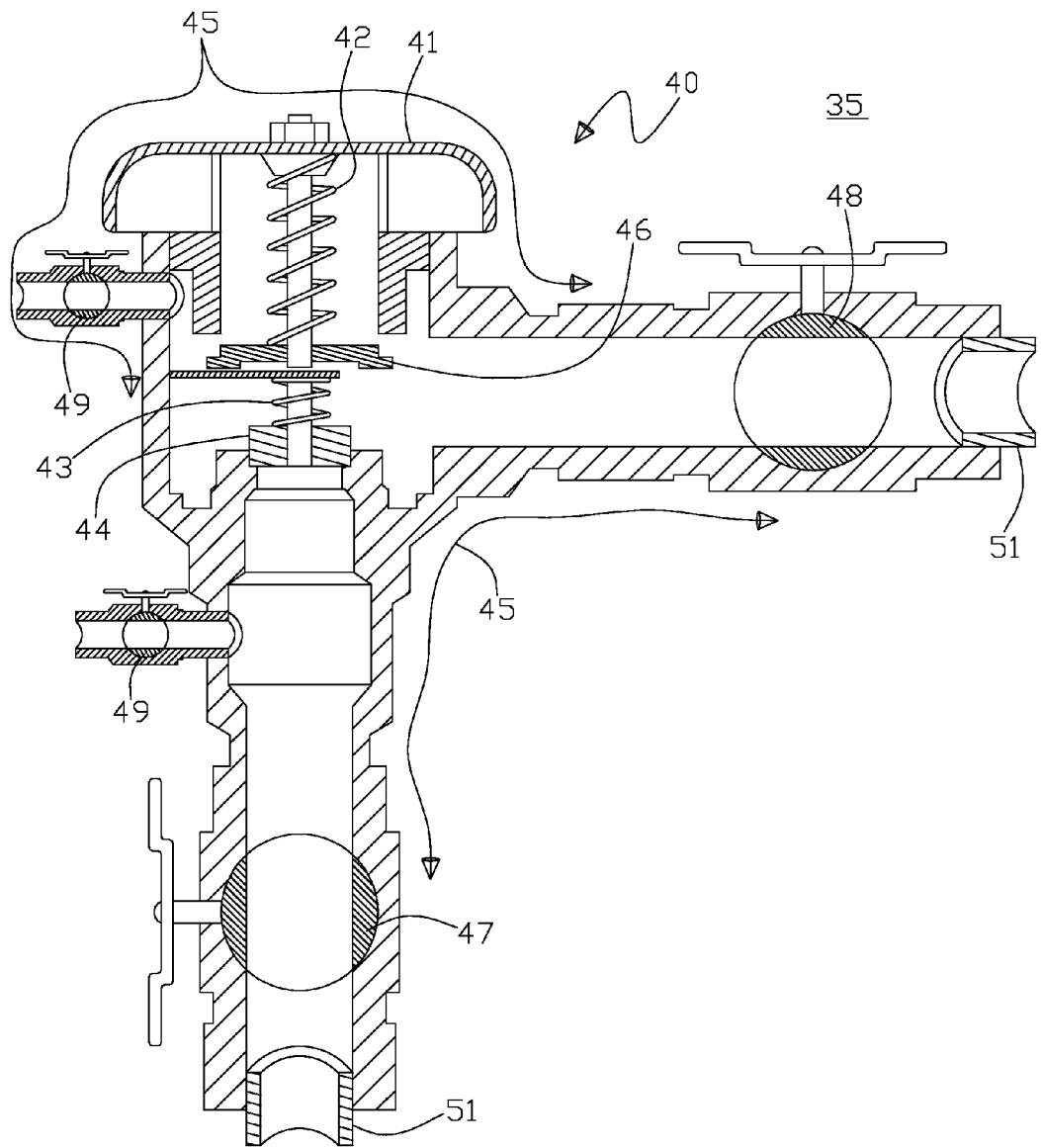
FIG. 1 shows a cross sectional view of the article assembly or as typically a plumbing component assembly that is exposed to the external environment, wherein the plumbing component assembly is in the default operational state with the anti-siphon valve springs closing off the feed side valve and opening the vent valve to atmosphere side, wherein the municipal water side ball valve is open, the sprinkler heads ball valve is open, and the two bleed valves are open with the complete plumbing component assembly dry in the "as shipped" condition, note also shown is the unique convoluted exterior surface of the article being attributed to the combination of valves and piping that are typically arranged distance wise to one another in an arbitrary manner.

30 Self contained heat transfer apparatus
31 Alternative embodiment of the self contained heat transfer apparatus
32 Two part embodiment of the self contained heat transfer apparatus
33 Prior art embodiment of a self contained heat transfer apparatus that is commercially available
34 Prior art embodiment of a self contained heat transfer apparatus that is commercially available 33 with the addition of a one inch layer of fiberglass wool 72 in-between the plumbing component assembly 40 and the heat transfer apparatus
35 External environment or atmospheric side for taking readings on the ambient temperature
36 Hook and loop fastener of the prior art embodiments 33 and 34
37 Outer covering shell of the prior art embodiments 33 and 34
38 Closed cell foam disposed within the outer covering shell 37
39 Anti-siphon valve 41 lower housing
40 Article assembly or plumbing component assembly
41 Anti-siphon valve
42 Vent spring for the anti-siphon valve 41
43 Municipal feed side valve spring for the anti-siphon valve 41
44 Municipal feed side valve for the anti-siphon valve 41
45 Unique convoluted exterior surface of the article 40
46 Vent valve for the anti-siphon valve 41
47 Municipal water feed ball valve
48 Sprinkler head ball valve
49 Bleed vent valves
50 A portion of the exterior surface 45 of the article 40
51 Piping
52 Normal water flow to the sprinkler heads
53 Backflow water from the sprinkler heads
54 No municipal water system pressure
55 First portion of the exterior surface 45 of the article 40
56 Municipal water system supply
57 Sprinkler head side
58 Ice-expanding in volume from water
59 Water
60 Second portion of the exterior surface 45 of the article 40
61 Temperature sensor for anti-siphon valve 41
62 Insulation for temperature sensor 61
63 Readout for temperature sensor 61
64 Surface of water 59
65 Panel or ground surface
66 Ambient temperature readout of the external environment 35
67 Ground temperature sensor
68 Readout for the ground temperature sensor
69 Bubble pack sheet sandwiched by foil disposed in-between the closed cell foam 38 and the outer shell 37 that is exposed to the exterior environment 35
70 Flexible surrounding sidewall
71 Volumetric air space in-between the plumbing component surface 45 and the prior art embodiments 33 and 34 cover shell 37
72 One inch thick layer of fiberglass wool sheet
75 Primary base of the flexible surrounding sidewall 70
80 Secondary base of the flexible surrounding sidewall 70
85 Longitudinal axis of the flexible surrounding sidewall 70
90 Interior of the of the flexible surrounding sidewall 70
91 Periphery of the sidewall 70
92 Distance of the sidewall 70
95 A portion of the surrounding sidewall 70 is in contact with a portion of the exterior surface 45 of the article 40
100 Inverted "U" configuration of the flexible surrounding sidewall 70 along the longitudinal axis 85
105 Substantial conforming of the moldable insulating material 200 in a custom manner about the article 40 unique convoluted exterior surface 45
110 Portion of sidewall 70 disposed within the cover open space portion 245
115 Portion of sidewall 70 freely protruding from outside of cover open space portion 245
120 First flexible surrounding sidewall
125 First base of the first flexible surrounding sidewall 120
130 First closure of the first flexible surrounding sidewall 120
135 Open state of first closure 130
140 First periphery of the first sidewall 120
145 Perpendicularly oriented first distance as between the first base 125 and the first closure 130
150 First interior of the first sidewall 120
155 Portion of first sidewall 120 that is in contact with the first portion 55 of the exterior surface 45 of the article 40
160 Second flexible surrounding sidewall
165 Second base of the second flexible surrounding sidewall 160
170 Second closure of the second flexible surrounding sidewall 160
175 Open state of second closure 170
180 Second periphery of the second sidewall 160
185 Perpendicularly oriented second distance as between the second base 165 and the second closure 170
190 Second interior of the second sidewall 160
195 Portion of second sidewall 160 that is in contact with the second portion 60 of the exterior surface 45 of the article 40
200 Moldable insulating material
205 Separable clam shell interface arrangement about the article exterior surface 45 about the article unique convoluted exterior surface 45
215 Substantial filling or expanding of the moldable insulating material 200 in the interior 90 or the first 150 and second 190 interiors and cover 230 or 235 open space 245
220 Means for removably retaining the first sidewall 120 and the second sidewall 160 to one another in the clam shell arrangement 205
225 Means for removably retaining the sidewall 70 in the inverted "U" shaped clam shell arrangement 205
230 Removably engagable flexible outer cover for the means 220 for removably retaining the first sidewall 120 and the second sidewall 160 to one another in the clam shell arrangement 205
235 Removably engagable flexible outer cover for the means 225 for removably retaining the sidewall 70 in the inverted "U" shaped 100 clam shell arrangement 205
240 Open ended enclosure of cover 230 or 235
245 Open space of cover 230 or 235
250 Fraction of the cover 230 or 235 contacting the panel 65
255 Remaining fraction of the cover 230 or 235 portion contacting the panel 65
260 Plurality of apertures therethrough
265 Slit configuration for the aperture 260
270 Length of slit 265
275 Opposed margin edges of slit 265
280 Thickness of the margin edges 275

285 Margin edges 275 normally urged substantially adjacent to one another into a closed state 325
290 Margin edges 275 substantially adjacent to one another in a closed state 325
295 Differential pressure as between the interior 90 or first 150 and second 190 interiors and the external environment 35
300 Discharge passage through the aperture 260 slit 265 in the open state 320
305 Margin edges yieldable into an open state 320 when exposed to differential pressure 295, wherein the margin edges 275 are urged apart from one another defining the discharge passage 300
310 Margin edges 275 separated into the open state 320
315 Maximum separation distance between margin edges 275 in the open state 320
320 Open state of the plurality of apertures 260
325 Closed state of the plurality of apertures 260
330 Air flow
335 Passage of air flow 330 through the plurality of apertures 260 discharge passages 300
340 Higher pressure within the interior 90 or the first 150 and second 190 interiors than in the external environment 35 placing the margin edges 275 into the open state 320 allowing air to flow 330 from the interior 90 or the first 150 and second 190 interiors to the external environment 35
345 Lower pressure within the interior 90 or the first 150 and second 190 interiors than in the external environment 35 placing margin edges 275 into the open state 320 allowing air to flow 330 from the external environment 35 to the interior 90 of the first 150 and second 190 interiors
350 Flexible radiant barrier material layer
355 Reflective foil material of the flexible radiant barrier 350
360 Adhesive sided high density foam layer of the flexible radiant barrier 350
365 Means for sealing in-between the first 120 and second 160 sidewalls at the clam shell interface 205
370 Removably engagable labyrinth seal for the means 365 for sealing in-between the first 120 and second 160 sidewalls at the clam shell interface 205
375 Means for sealing in-between the clam shell interface 205 of the "U" shaped 100 surrounding sidewall 70
380 Means for sealing in-between the cover 230 or 235 and the panel 65
385 Removably engagable labyrinth seal for the means 375 for sealing in-between the clam shell interface 205 of the "U" shaped 100 surrounding sidewall 70 and for the means 380 for sealing in-between the cover 230 or 235 and the panel 65

DETAILED DESCRIPTION

Broadly, with initial reference to FIG. 1 shown is a cross sectional view of the article assembly 40 or as typically a plumbing component assembly 40 that is exposed to the external environment 35, wherein the plumbing component assembly 40 is in the default operational state with the anti-siphon valve 41 springs 42 and 43 closing off the feed side valve 44 and opening the vent valve 46 to atmosphere 35 or external environment 35 side. Wherein the municipal water side ball valve 47 is open, the sprinkler heads ball valve 48 is open, and the two bleed valves 49 are open with the complete plumbing component assembly 40 dry in the "as shipped" condition. Note, also shown is the unique convoluted exterior surface 45 of the article 40 being attributed to the combination of valves 41, 44, 46, 47, 48, and 49 and piping 51 that are typically arranged distance wise to one another in an arbitrary fixed manner.

Figure 2:
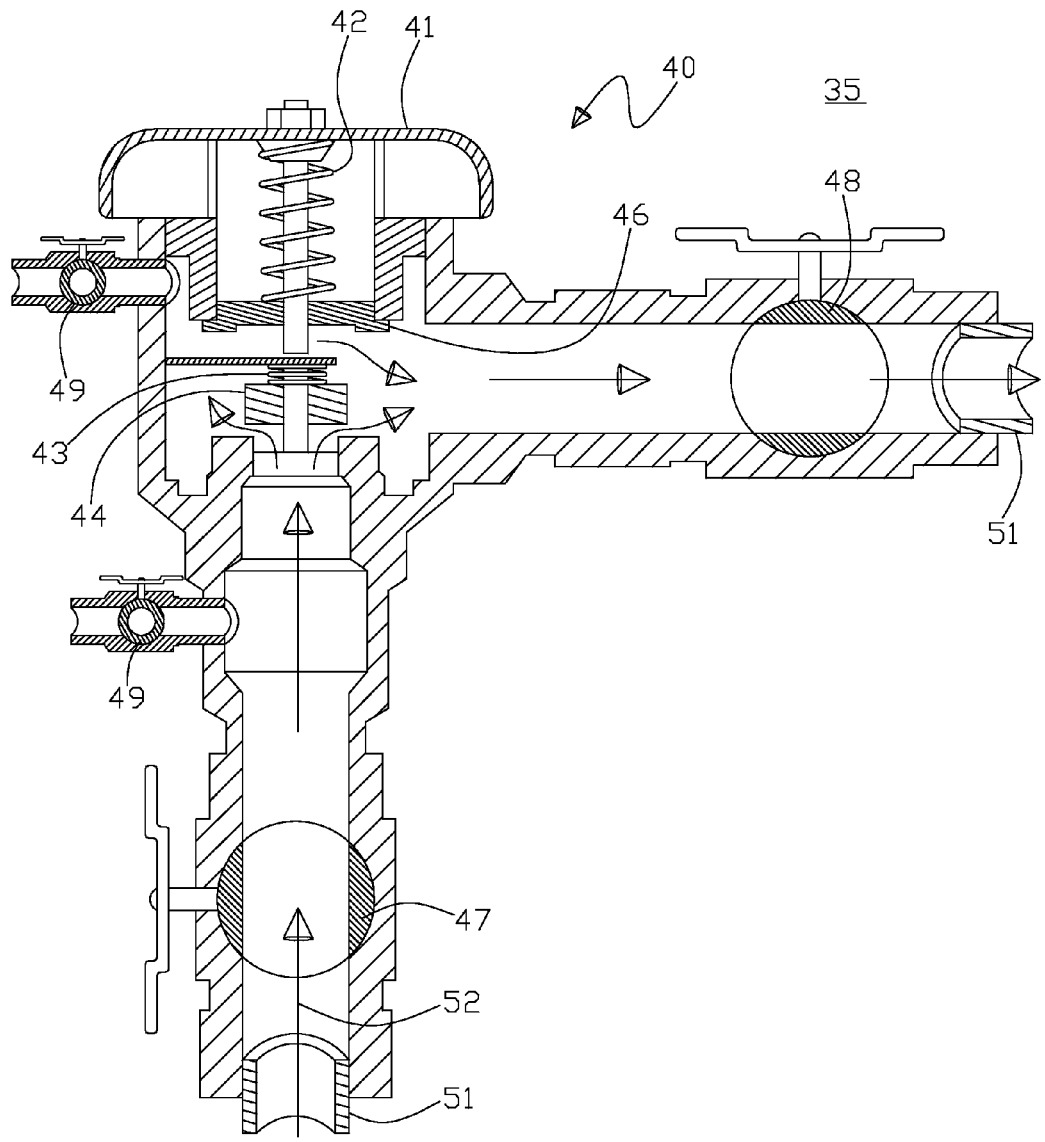
FIG. 2 shows a cross sectional view of the article assembly or as typically the plumbing component assembly that is exposed to the external environment, wherein the plumbing component assembly is in the "sprinkler head on" operational state with the anti-siphon valve springs both compressed wherein the feed side valve is open and the vent to atmosphere side valve is closed, wherein the municipal water side ball valve is open, the sprinkler heads ball valve is open, and the two bleed valves are closed with the complete plumbing component assembly wet in the sprinkler activated operational state condition.

Continuing to FIG. 2 shows a cross sectional view of the article assembly 40 or as typically the plumbing component assembly 40 that is exposed to the external environment 35, wherein the plumbing component assembly 40 is in the "sprinkler head on" operational state with the anti-siphon valve 41 springs 42 and 43 both compressed wherein the feed side valve 44 is open and the vent 46 to atmosphere side 35 valve is closed, wherein the municipal water side ball valve 47 is open, the sprinkler heads ball valve 48 is open, and the two bleed valves 49 are closed with the complete plumbing component assembly 40 wet in the operational state condition, wherein the water flows 52 are for the sprinkler being on.

Figure 3:
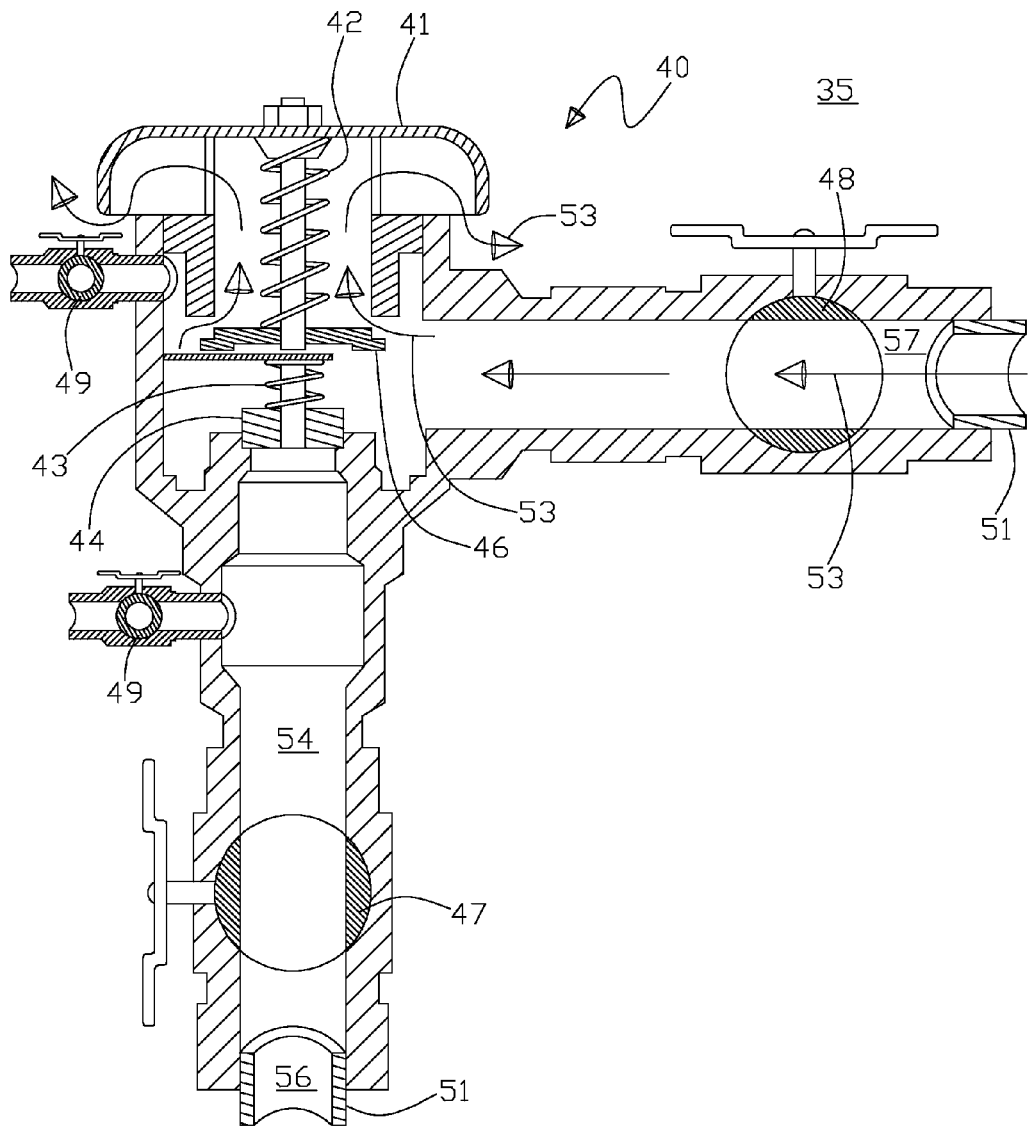
FIG. 3 shows a cross sectional view of the article assembly or as typically the plumbing component assembly that is exposed to the external environment, wherein the plumbing component assembly is in the "sprinkler head backflow" operational state with the anti-siphon valve springs both extended to their default positions wherein the feed side valve is closed with no municipal water system pressure and the vent to atmosphere side valve is open allowing the sprinkler head backflow to vent to the external environment and not to the municipal water supply system, wherein the municipal water side ball valve is open, the sprinkler heads ball valve is open, and the two bleed valves are closed with the plumbing component assembly wet on the sprinkler head side in the sprinkler head backflow operational state condition.

Next, FIG. 3 shows a cross sectional view of the article assembly 40 or as typically the plumbing component assembly 40 that is exposed to the external environment 35, wherein the plumbing component assembly 40 is in the "sprinkler head backflow" operational state with the anti-siphon valve 41 springs 42 and 43 both extended to their default positions wherein the feed side valve 44 is closed with no municipal water system pressure 54 and the vent to atmosphere side 35 valve 46 is open allowing the sprinkler head backflow 53 to vent to the external environment 35 and not to the municipal water supply system 56. Wherein in FIG. 3 the municipal water side 56 ball valve 47 is open, the sprinkler heads ball valve 48 is open, and the two bleed valves 49 are closed with the plumbing component assembly 40 wet on the sprinkler head side 57 in the sprinkler head backflow 53 operational state condition, thus fulfilling the purpose of the anti-siphon valve 41 purpose in preventing municipal water supply 56 contamination from the sprinkler heads side 57 back flow 53, should there be no municipal water system 56 pressure 54 present.

Figure 4:
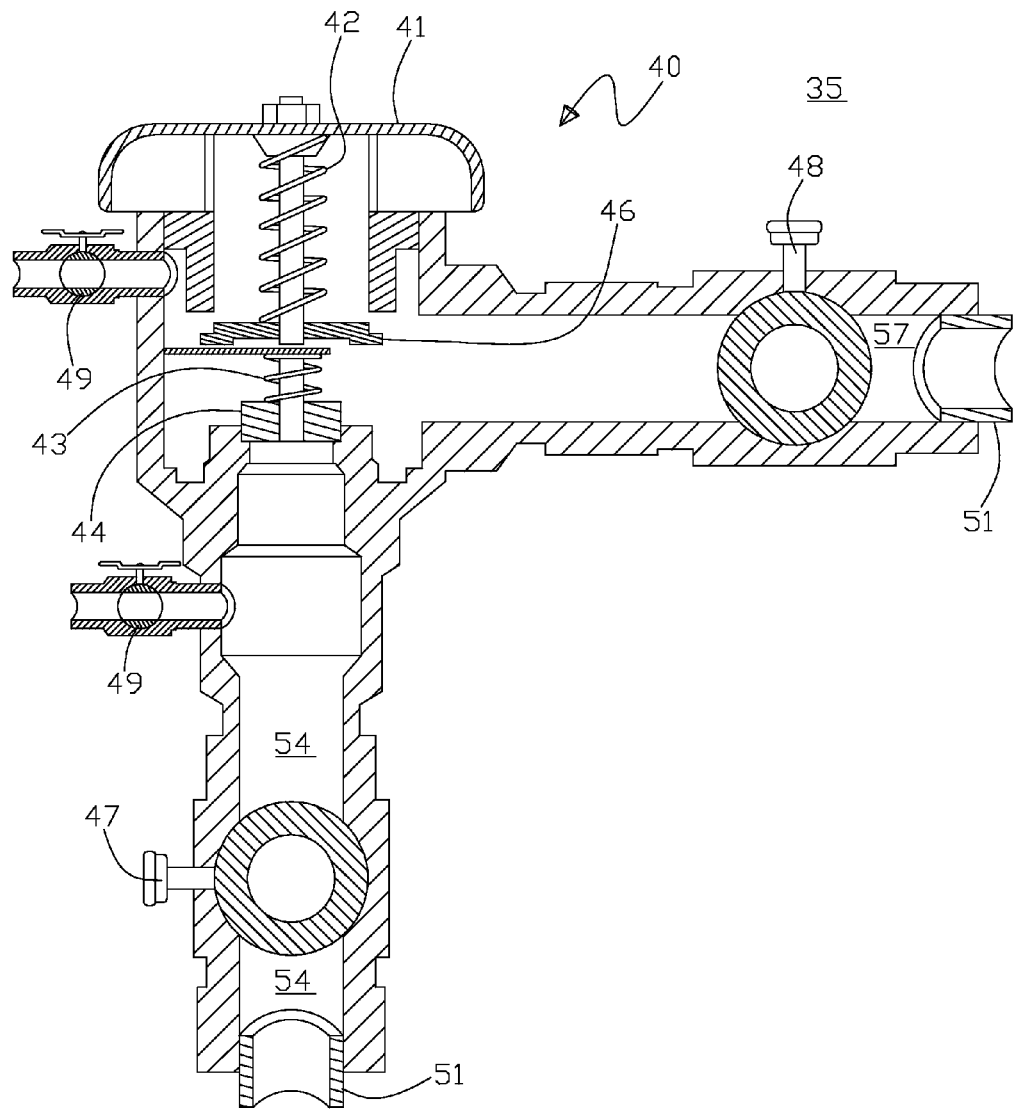
FIG. 4 shows a cross sectional view of the article assembly or as typically the plumbing component assembly that is exposed to the external environment, wherein the plumbing component assembly is in the properly winterized operational state with the anti-siphon valve springs closing off the feed side valve and opening the vent valve to atmosphere side, wherein the municipal water side ball valve is closed, with the municipal water supply off, the sprinkler heads ball valve is closed, and the two bleed valves are open with the complete plumbing component assembly dry in the winterized operational state condition and essentially is immune to damage from winter freezing.

Yet further, in FIG. 4 shown is a cross sectional view of the article assembly 40 or as typically the plumbing component assembly 40 that is exposed to the external environment 35, wherein the plumbing component assembly 40 is in the properly winterized operational state with the anti-siphon valve 41 springs 42 and 43 closing off the feed side valve 44 and opening the vent valve 46 to atmosphere side, wherein the municipal water side 56 ball valve 47 is closed. With the municipal water supply off having no pressure 54, the sprinkler heads side 57 ball valve 48 is closed, and the two bleed valves 49 are open with the complete plumbing component assembly 40 dry in the winterized operational state condition thus being essentially is immune to damage from winter freezing being exposed to the external environment 35.

Figure 5:
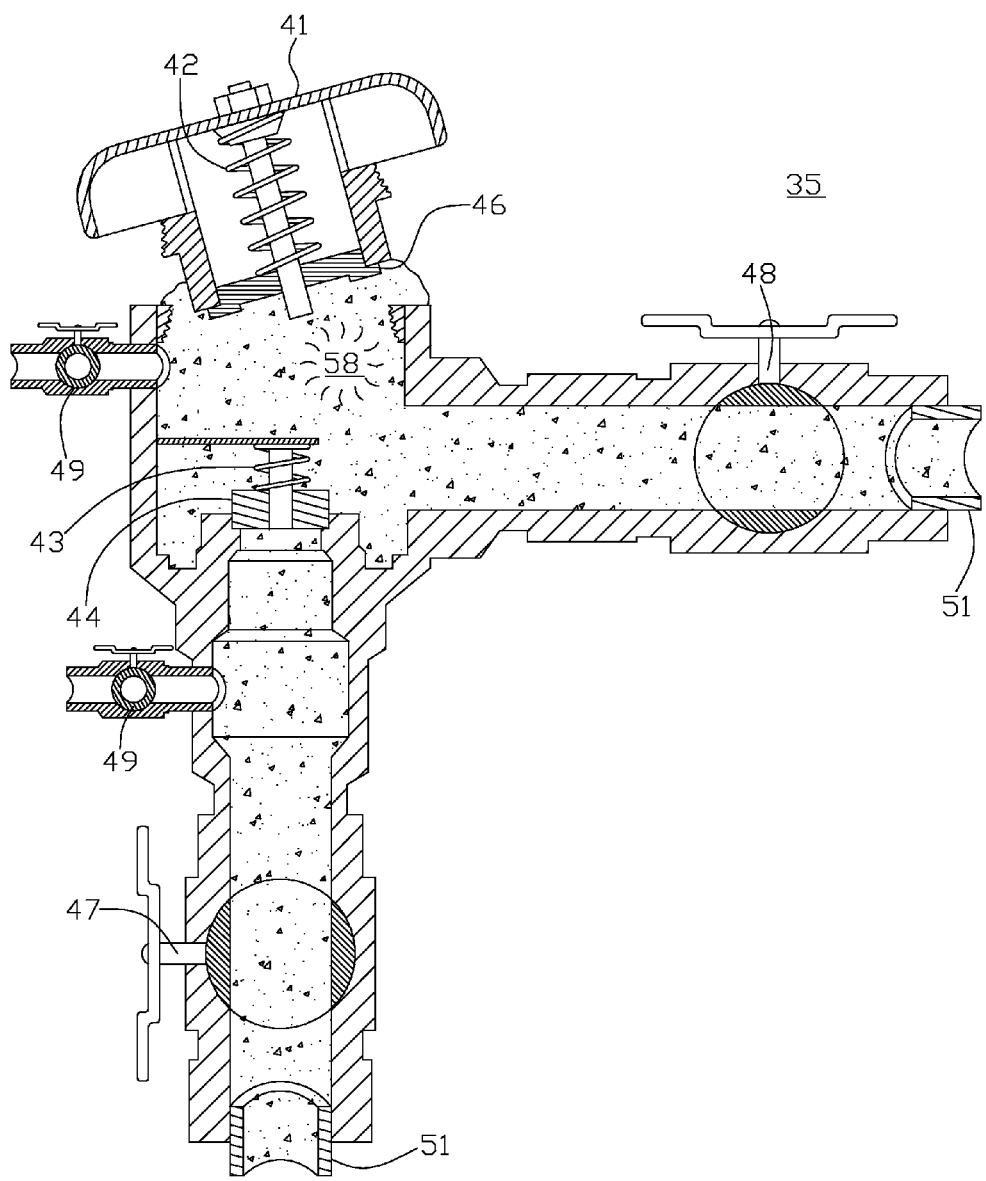
FIG. 5 shows a cross sectional view of the article assembly or as typically the plumbing component assembly that is exposed to the external environment, wherein the plumbing component assembly is in the "freezing failure" operational state with the anti-siphon valve external vent spring compressed shut and closed from the expanding freezing water pressure wherein the municipal feed side valve is compressed shut again due to the expanding freezing water and in conjunction with the vent to atmosphere side valve being closed, wherein the municipal water side ball valve is open, wherein the water in the pipe could be freezing or toward the non-freezing main municipal water shut-off valve, the sprinkler heads ball valve is open, and the two bleed valves are closed with the complete plumbing component assembly that is exposed to the external environment freezing, wherein the significant freezing water expansion forces will rupture the weakest component typically being the vent valve due to it having the largest area equaling the highest force with the vent valve fracturing outwardly into the external environment resulting in the freezing failure operational state condition, note also the vent valve is typically constructed of weaker material (plastic) than the rest of the plumbing component assembly being typically constructed of copper and brass.

Continuing in FIG. 5 shown is a cross sectional view of the article assembly 40 or as typically the plumbing component assembly 40 that is exposed to the external environment 35, wherein the plumbing component assembly 40 is in the "freezing failure" operational state with the anti-siphon valve 41 external vent spring 42 compressed shut and the vent valve 46 is closed from the expanding freezing water 58 pressure wherein the municipal feed side 56 valve 44 is compressed shut again due to the expanding freezing water 58 and in conjunction with the vent to atmosphere or external environment 35 side valve 46 being closed. Wherein the municipal water side 56 ball valve 47 is open, wherein the water 59 in the pipe 51 could be freezing toward the non-freezing main municipal water shut-off valve (not shown as it is typically inside a building or deep enough in the ground, in any case in a non-freezing area), the sprinkler heads ball valve 48 is open, and the two bleed valves 49 are closed with the complete plumbing component assembly 40 that is exposed to the external environment 35 freezing, wherein the significant freezing water 58 expansion forces will rupture the weakest component typically being the vent valve 46 due to it having the largest area equaling the highest force against it with the vent valve 46 fracturing outwardly into the external environment 35 resulting in the freezing failure operational state condition. Note that FIG. 5, is essentially FIG. 2 with the remote timed sprinkler head valves (not shown) being off, and the plumbing component assembly 40 being completely wet and then exposed to the freezing external environment 35 conditions as would happen in the change of season scenario, i.e. in the fall or spring when the sprinkler system is operational (see FIG. 2) and a sudden overnight freeze occurs in the environment 35 after the sprinkler is placed in the operational state, potentially risking the scenario in FIG. 5.

Figure 6:
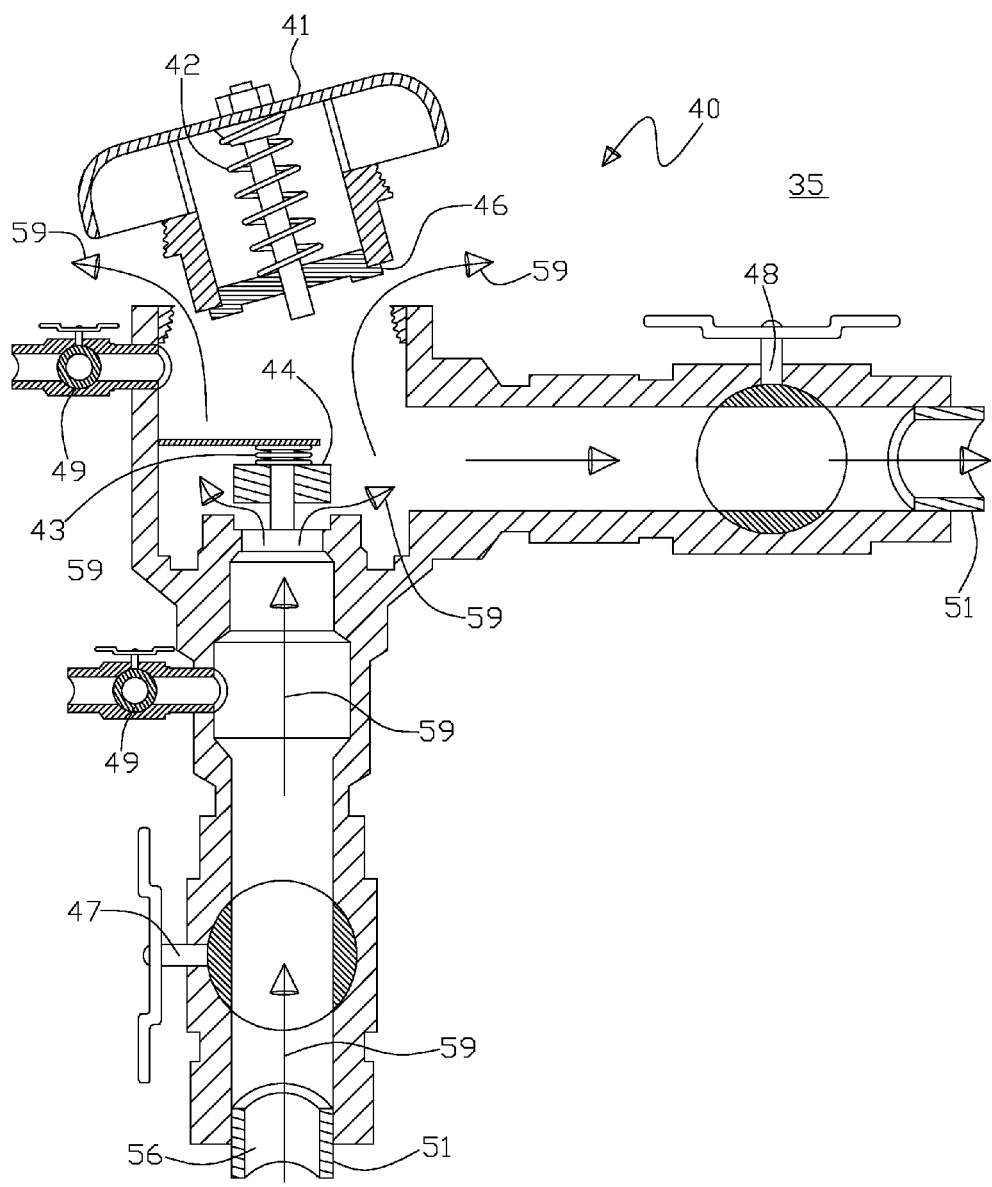
FIG. 6 shows a cross sectional view of the article assembly or as typically the plumbing component assembly that is exposed to the external environment, wherein the plumbing component assembly is in the "leaking failure" operational state with this state coming after that shown in FIG. 5 once the ice starts to melt resulting in a major water system leak in that the municipal water supply pressure is wide open to the external environment resulting in excessive water waste, a wide area surface icing hazard, and the required replacement of the anti-siphon valve resulting in the leaking failure operational state condition.

Further, FIG. 6 shows a cross sectional view of the article assembly 40 or as typically the plumbing component assembly 40 that is exposed to the external environment 35, wherein the plumbing component assembly 40 is in the "leaking failure" operational state with this state coming after that shown in FIG. 5 once the ice 58 starts to melt resulting in a major municipal water system 56 leak in that the municipal water supply pressure is wide open to the external environment 35 resulting in excessive water 59 waste, a wide area surface icing hazard as the leaking water may re-freeze once it's dispersed from the failed or broken siphon-valve 41, and the required replacement of the failed anti-siphon valve 41 that resulted in the leaking failure operational state condition. Thus this represents in FIGS. 5 and 6 the results of a season change freezing anti-siphon valve failure 41, as it is assumed that once freezing weather in the environment is continuous, then the plumbing component assembly is placed in the winterized state as shown in FIG. 4, wherein there will be no damage from freezing weather.

Figure 7:
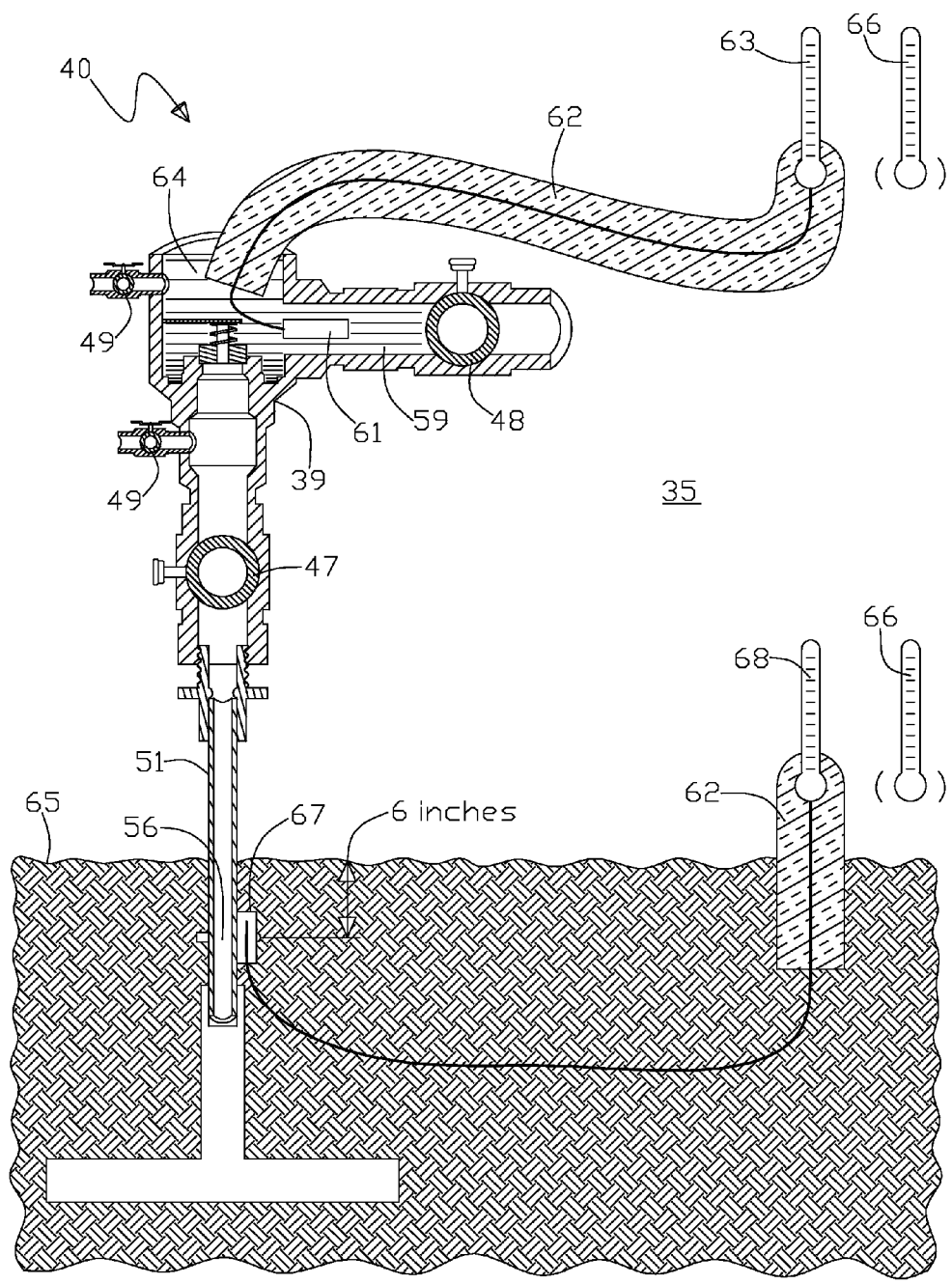
FIG. 7 shows a cross sectional view of the article assembly or as typically the plumbing component assembly that is exposed to the external environment, wherein the plumbing component assembly is setup in the baseline test configuration with the external vent valve removed to allow ease of access for the valve temperature sensor that is insulated as between the temperature readout and the siphon housing, further to be able to observe the water going from liquid to slush to frozen solid in the siphon valve housing, also with the external vent valve removed to be conservative on maximizing the heat loss from the siphon valve housing, due to increased convection across the free and open water surface in the siphon valve housing, thus ensuring that the real world results would be equal to or better than the test results, the upper portion of the plumbing assembly is filled with water to detect freezing, also shown is the ambient external environment temperature indicator as well as the ground temperature on the municipal water system inlet point that is positioned about six inches below the ground surface, note that all of the valves in the plumbing assembly are closed as in FIG. 4, plus the bleed valves are also closed to hold in the water in the upper portion of the plumbing assembly for testing.

Next, FIG. 7 shows a cross sectional view of the article assembly 40 or as typically the plumbing component assembly 40 that is exposed to the external environment 35, wherein the plumbing component assembly 40 is setup in the baseline test configuration with the external vent valve 41 removed to allow ease of access for the valve temperature sensor 61 that is insulated 62 as between the temperature readout 63 and the siphon lower housing 39, further to be able to observe the water 59 going from liquid to slush to frozen solid in the siphon valve lower housing 39, also with the external vent valve 41 removed to be conservative on maximizing the heat loss from the siphon valve lower housing 39, due to increased convection across the free and open water 59 surface 64 in the siphon valve lower housing 39. Thus ensuring that the real world heat transfer results would be equal to or better than the test results, wherein the real world heat transfer would typically be equal to or less than the test results. In addition, looking at FIG. 7, the upper portion of the plumbing assembly being the ball valves 47 and 48 are also filled with water 59 to detect freezing. Further shown in FIG. 7, is the ambient external environment 35 temperature indicator 66 as well as the ground temperature measurement 67 and indicator 68 on the municipal water system 56 inlet point that is positioned about six inches below the ground surface 65. Note that the valves 47 and 48 in the plumbing assembly 40 are closed as in FIG. 4, plus the bleed valves 49 are also closed to hold in the water 59 in the upper portion of the plumbing assembly 40 as shown.

Figure 8:
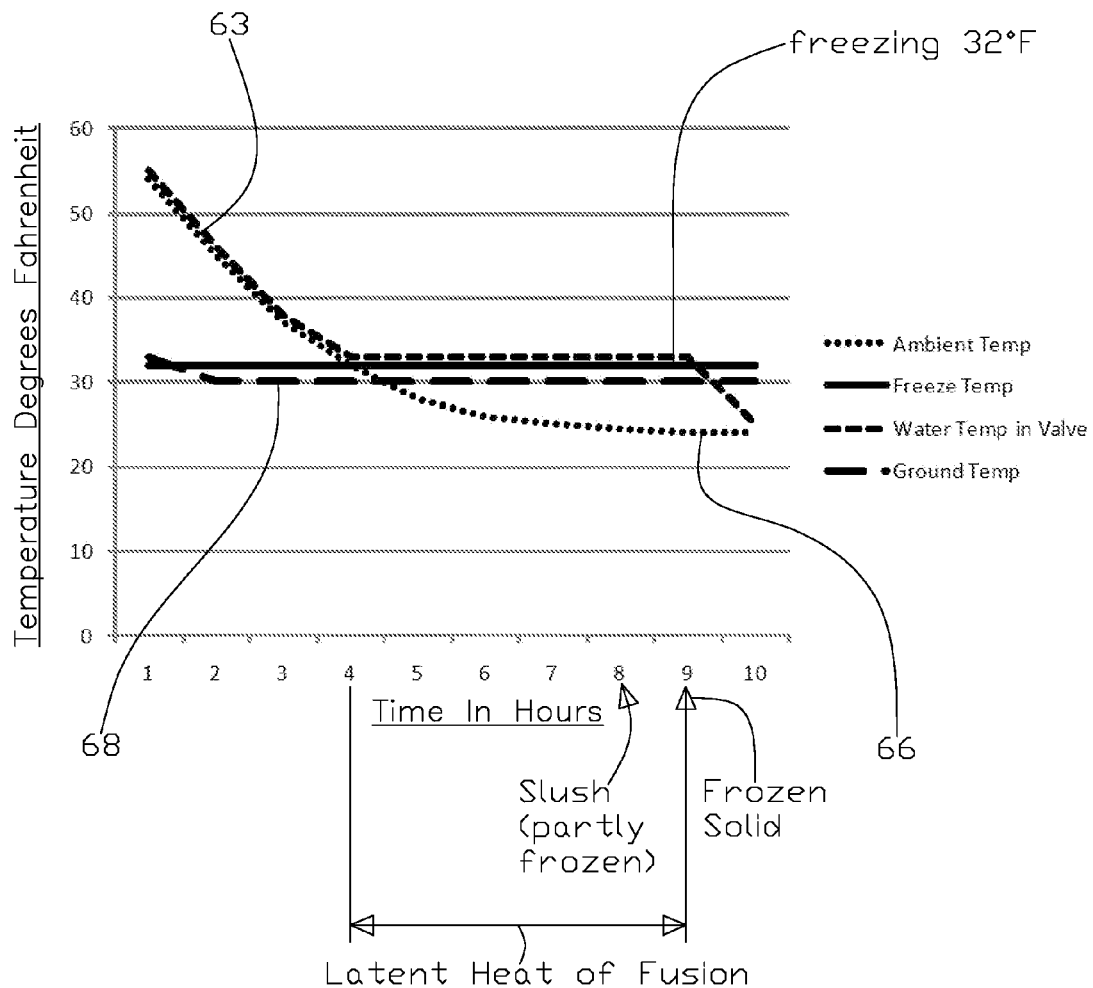
FIG. 8 shows test data from the baseline test setup as shown in FIG. 7, with the data taken with the plumbing component assembly naked in that there was no insulating cover in place so that baseline temperature change and siphon valve water freezing data could be obtained, what is basically shown is the temperature in degrees Fahrenheit in the "Y" or vertical axis and elapsed time in hours on the "X" or horizontal axis, wherein it can be seen that the ambient temperature goes from the mid fifties in temperature declining to the lower twenties, wherein what is desired is that the ambient temperature starts above freezing and goes below freezing for an appreciable time, thus here it is seen that that the latent heat of fusion for the water in the anti-siphon valve housing is at about five hours of time, thus in the insulated plumbing component assembly tests, we know that anti-siphon valve freezing damage is likely once the valve water temperature is at thirty-two degrees Fahrenheit for about five hours or more, in addition as a reference the shallow ground temperature at six inches below the ground surface adjacent to the municipal water supply pipe is shown as being relatively consistent, wherein water could freeze in this area, however, as indicated in FIG. 5, the weak link in the plumbing component assembly that would be most prone to failure is the anti-siphon valve assembly.

Continuing, FIG. 8 shows test data from the baseline test setup as shown in FIG. 7 with the data taken with the plumbing component assembly 40 naked in that there was no insulating cover in place so that baseline temperature change and siphon valve water freezing data could be obtained for comparing the four temperature readouts of the two ambient external environment 35 temperature readouts 66, the anti-siphon valve lower housing 39 temperature readout 63, and the ground temperature readout 68. So that with all the aforementioned temperature readouts experiencing the same range of ambient environment 35 range of temperatures, differences in these temperature readouts that are in the same environmental 35 temperature could be accounted for in calibrating the temperature readouts for the various insulated cover tests, wherein the valve lower housing 39 temperature readout 63, and the ground temperature readout 68 would be reading different (being slightly higher) temperatures than ambient environment 35 range of temperatures. Note that these calibrating temperature readouts are from differences in the ambient 35 bulb readouts 66 and the remote bulb 61 and 67 readouts 63 and 68 respectively that are in the same ambient environment 35 temperature. Further as the piping 51 is constructed of copper it is assumed to transmit ambient environment 35 temperature to the remote bulb 67 as it is shallow at six inches below the surface 65.

In looking at the FIG. 8 graph, what is basically shown is the temperature in degrees Fahrenheit in the "Y" or vertical axis and elapsed time in hours on the "X" or horizontal axis, noting that these temperatures for the anti-siphon valve lower housing 39 temperature readout 63, and the ground temperature readout 68 are calibration corrected as described above. Wherein it can be seen that the ambient 35 temperature goes from the mid fifties in temperature declining to the lower twenties, wherein what is desired is that the ambient temperature starts above freezing and goes below freezing for an appreciable time, as this best simulates the seasonal change weather that the present invention is looking to be useful for. Thus when the sprinkler system is operational for lawn and garden watering wherein a sudden overnight weather freeze occurs, such that the ambient 35 temperature is certainly above freezing by at least twenty degrees Fahrenheit or so, and then dropping to at or below freezing typically overnight, with the present invention protecting against anti-siphon valve 41 freezing and damage until the plumbing assembly 40 can be safely properly winterized, see FIG. 4 when the ambient 35 temperature is above freezing again.

Thus in FIG. 8, here it is seen from the test data as set of in FIG. 7 that that the latent heat of fusion for the water 59 in the anti-siphon valve 41 housing 39 is actually at about five hours, thus in the insulated plumbing component 40 assembly tests, we know that anti-siphon valve freezing 41 damage is likely once the valve 41 water temperature 63 is at thirty-two degrees Fahrenheit for about five hours or more. In addition as a reference the shallow ground temperature 67 at six inches below the ground surface 65 adjacent to the municipal water supply 56 pipe 51 is shown as being relatively consistent, wherein water could freeze in this area, however, as indicated in FIG. 5, the weak link in the plumbing component assembly 40 that would be most prone to failure is the anti-siphon valve assembly 41 due to the larger surface area of the vent 46 (relative to the other plumbing components 40) and its weaker structure being typically plastic construction as opposed to the other plumbing components 40 being constructed of copper, steel, or brass/bronze.

Figure 9:
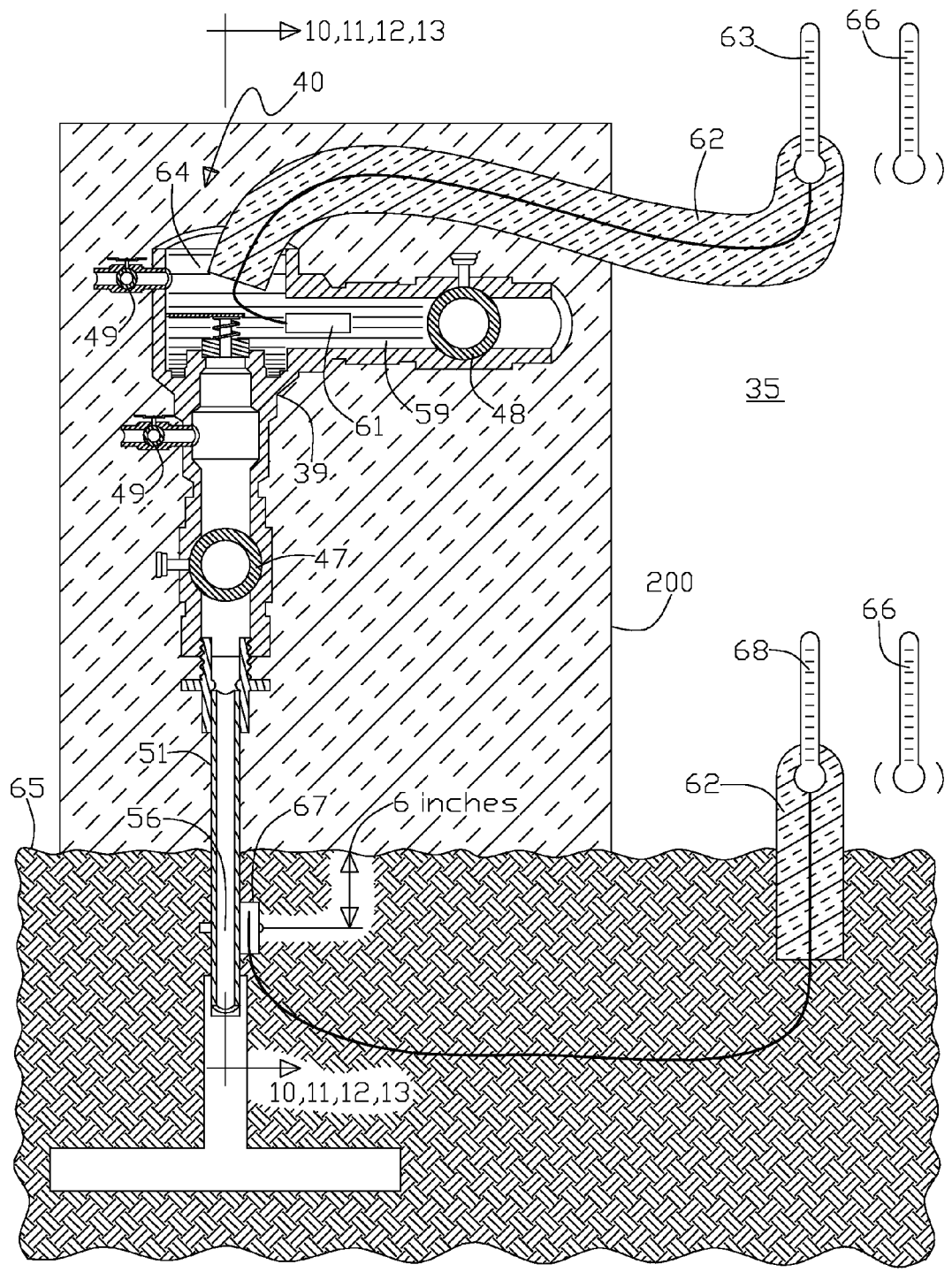
FIG. 9, being similar to FIG. 7 shows a cross sectional view of the article assembly or as typically the plumbing component assembly that is exposed to the external environment, wherein the plumbing component assembly is setup in the baseline insulated test configuration with the external vent valve removed to allow ease of access for the valve temperature sensor that is insulated as between the temperature readout and the siphon housing, also with the external vent valve removed to be conservative on maximizing the heat loss from the siphon valve housing, thus ensuring that the real world results would be equal to or better than the test results, the upper portion of the plumbing assembly is filled with water to detect freezing, also shown is the ambient external environment temperature indicator as well as the ground temperature on the municipal water system inlet point that is positioned about six inches below the ground surface, note that all of the valves in the plumbing assembly are closed as in FIG. 4, plus the bleed valves are also closed to hold in the water in the upper portion of the plumbing assembly, various types of insulation were tested with each type encasing the plumbing component assembly as shown.

Continuing, in FIG. 9, being similar to FIG. 7 shows a cross sectional view of the article assembly 40 or as typically the plumbing component assembly 40 that is exposed to the external environment 35, wherein the plumbing component assembly 40 is setup in the baseline insulated test configuration with the external vent valve 46 removed to allow ease of access for the anti-siphon valve lower housing 39 water 59 temperature sensor 61 that is insulated 62 as between the temperature readout 63 and the anti-siphon valve lower housing 39. Also, as previously mentioned, FIG. 9 shows the external vent valve 46 removed to be conservative on maximizing the heat loss from the anti-siphon valve lower housing 39, thus ensuring that the real world results would be equal to or better than the test results. Further in FIG. 9, the upper portion of the plumbing assembly 40 including the anti-siphon valve lower housing 39, and ball valves 47 and 48 are filled with water 59 to the surface level 64 to detect freezing 58. Also shown is the ambient external environment 35 temperature readout 66 as well as the ground temperature 67 bulb sensor and associated temperature readout 68, noting that the bulb 67 sensor extension from the readout 68 is insulated 62 much the same as the water 59 temperature sensor 61, wherein temperature sensor 67 is positioned in contact with the municipal water system inlet 56 point on the pipe 51 that is positioned about six inches below the ground surface 65. Note that the valves 47 and 48 in the plumbing assembly are closed as in FIG. 4, plus the bleed valves 49 are also closed to hold in the water 59 in the anti-siphon valve lower housing 39 of the plumbing assembly 40, wherein various types of insulation were tested with each insulation type encasing the plumbing component assembly 40 as shown.

Figure 10:
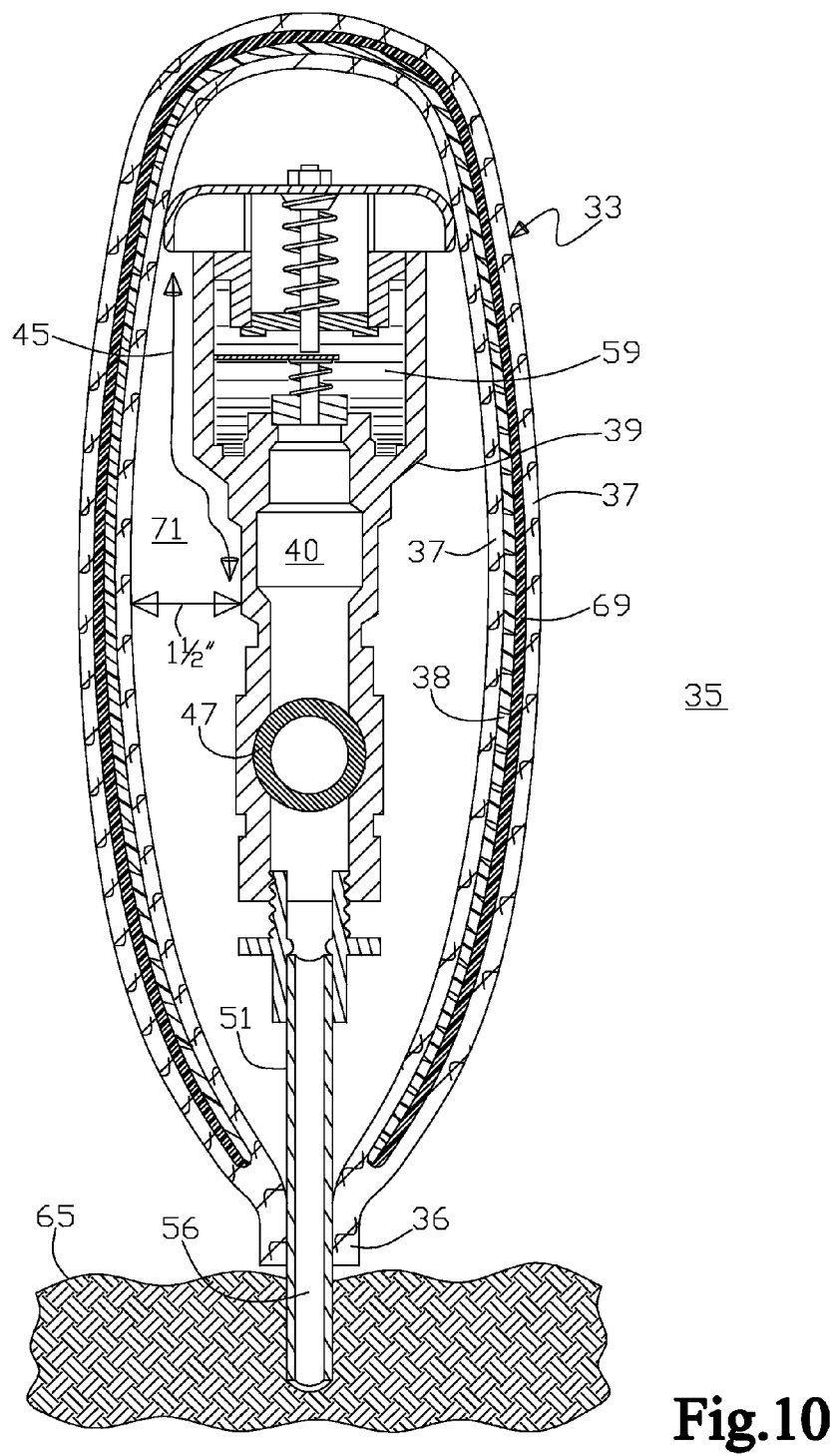
FIG. 10 is cross sectional view 10-10 from FIG. 9, wherein the differences in the insulation setups can be better shown, this particular insulation is a prior art unit currently available in numerous home improvement stores and is identified as the Petschek reference being U.S. Pat. No. 6,820,639, as described in the field and background portion of this application, in the commonly available commercial embodiment is essentially a large fold-over pocket with a hook and loop fastener on three sides, being affixed on the two sides and the bottom with the top being a fold-over as shown, thus this arrangement being able to facilitate the needed free access to the plumbing component assembly, the fold over being a sandwiched layer of an outer shell of black nylon type weave with a waterproof liner about sixteen thousandths of an inch thick with the hook and loop fastener forming a two inch border on three outer sides (when folded), note at the hook and loop fastener border, the total material is just the hook and loop fastener and two layers of the outer shell, moving inward from the border and in-between the outer shell layers in going from inside to outside is a one-half inch thick layer of closed cell foam followed by a one-hundred and fifty thousandths of an inch thick layer of plastic bubble pack with a foil covering on each side, as is shown the irregularities of the larger plumbing components cause the composite layering of the Petschek cover to project outward and away from the smaller plumbing components resulting in a volumetric air space residing within the sealed cover.

Next, in FIG. 10 shown is cross sectional view 10-10 from FIG. 9, wherein the differences in the insulation test setups can be better shown, this particular insulation is a prior art unit currently commercially available insulating cover 33 in numerous home improvement stores and is identified as the Petschek reference in the field and background of this patent application and identified as being U.S. Pat. No. 6,820,639, as further described in the field and background portion of this application. In the commonly available commercial embodiment the prior at unit 33 is essentially a large fold-over pocket with a hook and loop fastener on three sides, being affixed on the two sides and the bottom with the top being a fold-over as shown, thus this arrangement being able to facilitate the needed free access to the plumbing component assembly 40, the fold over being a sandwiched layer of an outer shell 37 being made of a black nylon type weave fabric with a waterproof liner being about sixteen thousandths of an inch thick with the hook and loop fastener 36 forming a two inch outer border on three outer sides (when folded). Note at the hook and loop fastener border 36, the total material is just the hook and loop fastener and two layers of the outer shell, moving inward from the border 36 and in-between the outer shell layers 37 in going from inside to outside is a one-half inch thick layer of closed cell foam 38 followed by a one-hundred and fifty thousandths of an inch thick layer of plastic bubble pack sheet with a foil covering 69 on each side of the bubble pack sheet. As is shown the outer surface irregularities 45 of the larger plumbing components cause the composite layering of the Petschek cover 33 to project outward and away from the smaller plumbing components resulting in a volumetric air space 71 residing within the sealed cover 33, wherein a gap as shown was about one and one-half inches.

Figure 11:
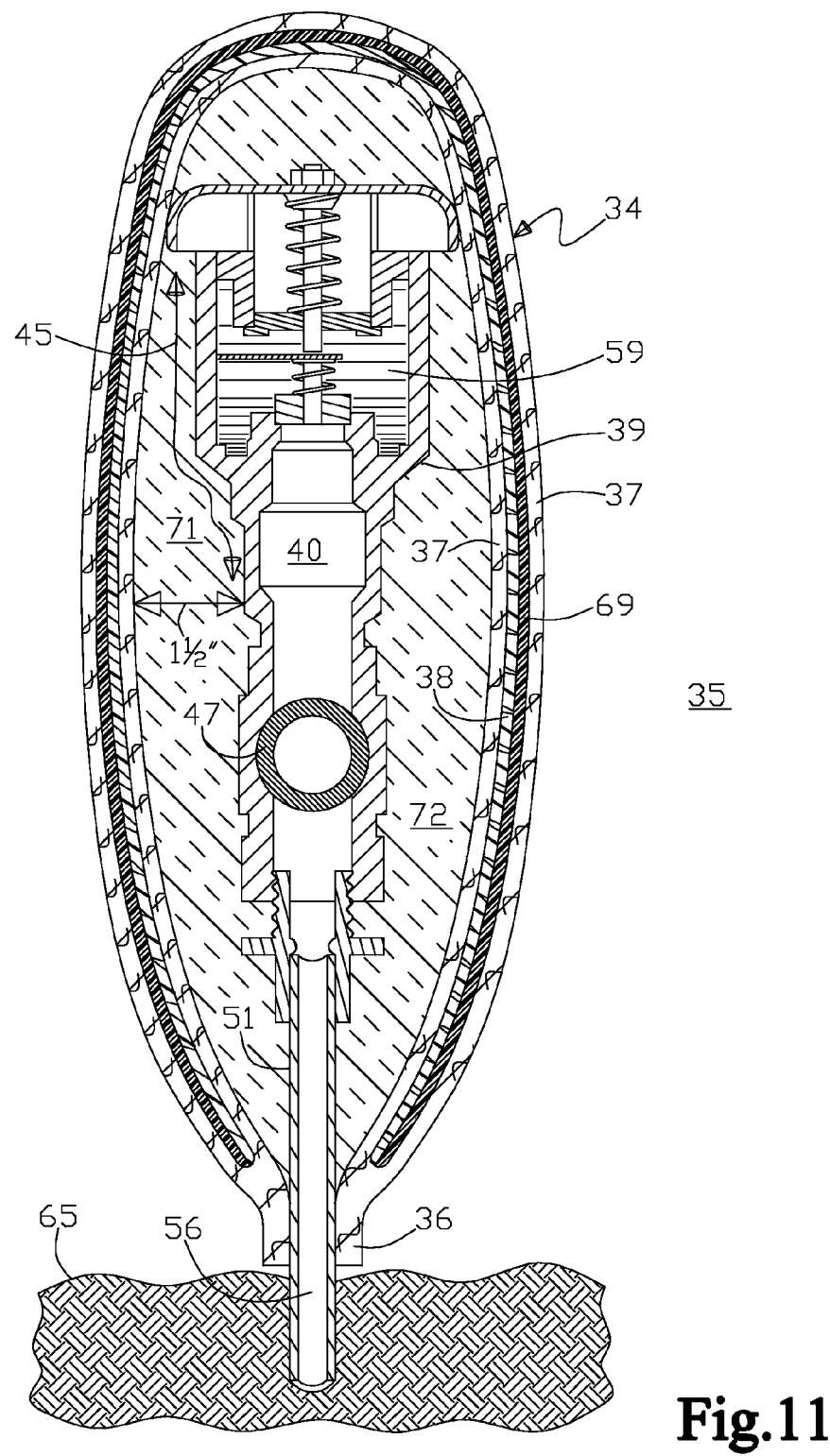
FIG. 11 is cross sectional view 11-11 from FIG. 9 and is essentially the same insulation testing setup as defined in FIG. 10, with the addition of a nominally one inch thick layer of fiberglass insulation folded over being adjacent and parallel to the inner shell material of the Petschek cover in an attempt to "fill in" the volumetric air space as shown in FIG. 10.

Yet further, in FIG. 11 shown is cross sectional view 11-11 from FIG. 9 being as essentially the same insulation testing setup as defined in FIG. 10, wherein the prior art embodiment 33 is modified with the addition of a nominally one inch thick layer of fiberglass insulation 72 folded over being adjacent and parallel to the inner shell material 37 of the Petschek cover 33 in an attempt to "fill in" the volumetric air space 71 as shown in FIG. 10. Wherein the modified prior art cover 34 did have somewhat better test performance with the addition of the fiberglass sheet 72 than the original cover embodiment 33, see FIG. 19.

Figure 12:
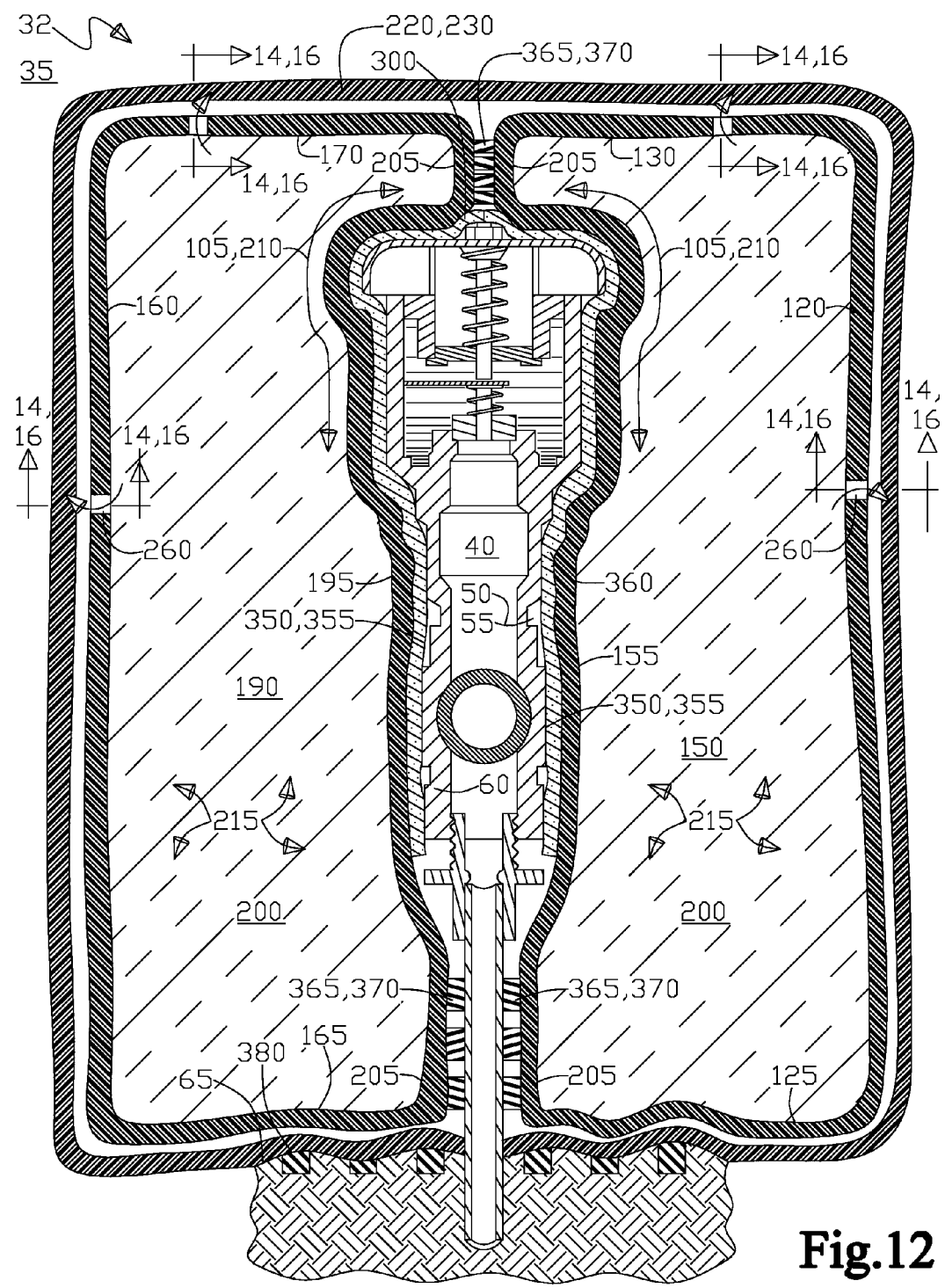
FIG. 12 is cross sectional view 12-12 from FIG. 9, wherein the differences in the insulation setups can be better shown from FIG. 9.
Figure 21:
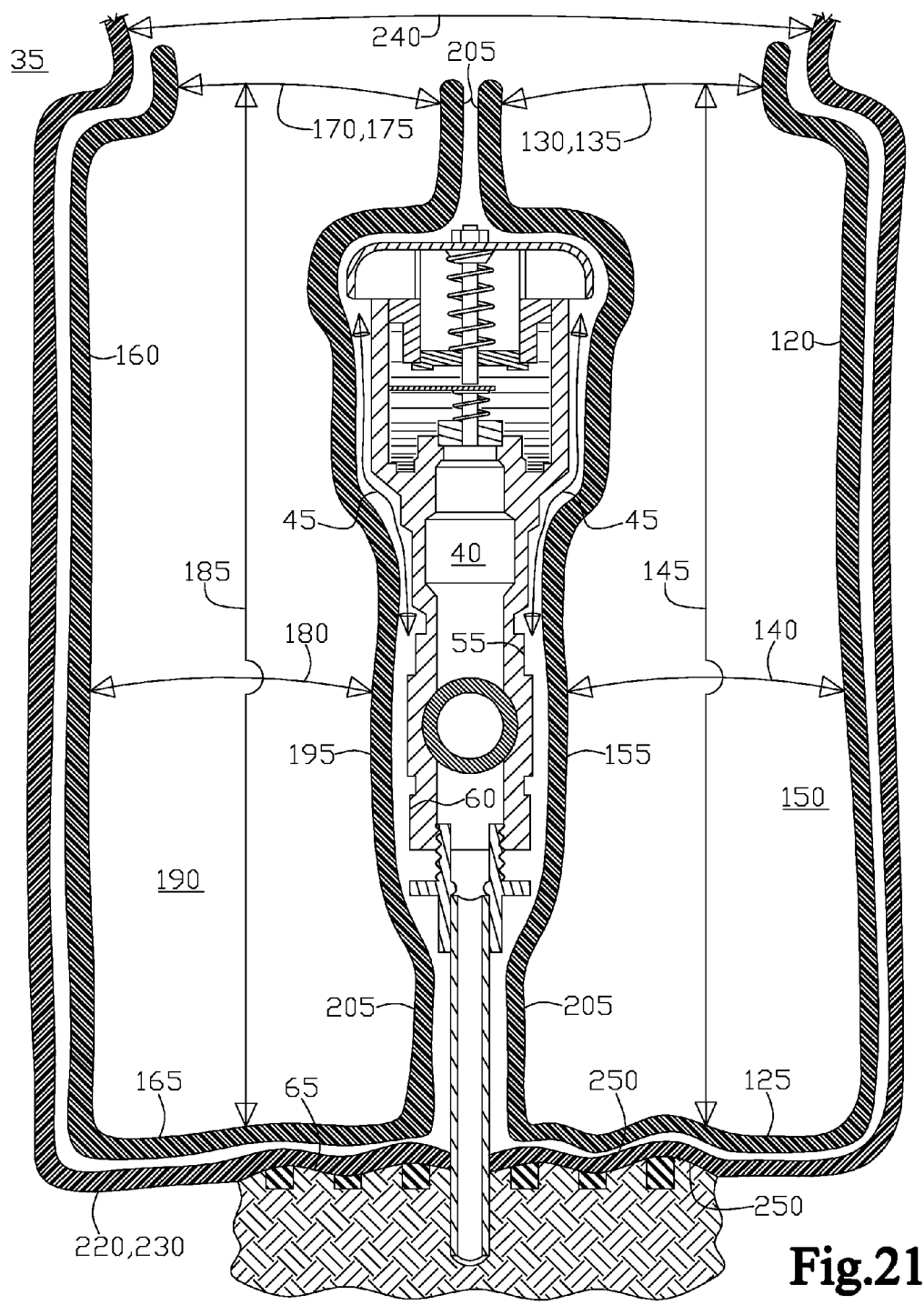
FIG. 21 is also a portion of the method of installing the heat transfer apparatus depiction showing the cover placed or positioned about the article of plumbing component assembly leaving an open space around the article and also showing the open ended enclosure at the top of the article, wherein the opposing end of the cover is in contact with the panel as in FIG. 20 and further showing the insertion of the first and second surrounding sidewalls disposed within the open space to in effect clam shell about the article with the first and second closures shown in the open state.

FIG. 12 is cross sectional view 12-12 from FIG. 9, wherein the differences in the insulation setups can be better shown from FIG. 9, FIG. 12 shows what is termed the two part rigid polyurethane insulating assembly 32 which includes a separable vertically split clamshell type 205 arrangement to facilitate the needed free access to the plumbing component assembly 40, wherein each vertically split half is a poured in place two part polyurethane mix 200 that can be used for the moldable insulating material 200. With each clamshell half insulation 200 being disposed within a multiple small slit 260 vented plastic bag 120 and 160, thus the two empty 150 and 190 clam shell bags, as shown in FIG. 21, are placed about each exterior surface side 45 of the plumbing component assembly 40. Then the two part polyurethane mix is added to the interior 150 and 190 of each bag, with the polyurethane mix growing or expanding 215 symmetrically within the plastic bag 120 and 160 due to the pressure 295 and 340 activated open 320 venting 260, see FIGS. 14 through 18, into a rigid closed cell foam insulation 200 having the ability to uniquely mold 210 the rigid closed cell foam insulation 200 around the unique plumbing component exterior surface 45 assembly 40 to minimize any open air spaces adjacent to the plumbing component assembly 40, essentially going from FIG. 21 to FIG. 12. Wherein the venting 260 closing 325 after the foam 200 has fully expanded 215 and no differential pressure 295 is present at the vents 260.

Also, in FIG. 12 being directly adjacent to the siphon valve housing 41 and the ball valve housings 47 and 48 is a layer of reflective 350 foil 355 backed by a one-eighth inch layer of flexible closed cell foam 360 that is adhered to each one of the clam shell halves 120 and 160, further in-between the clam shell 205 halves are a plurality of rubber labyrinth 370 seals to enhance sealing 365 as between the clamshell 205 halves 120 and 160. Also a flexible cover 230 is placed about both clamshell 205 halves 120 and 160 to hold the clam shell halves 120 and 160 together with another plurality of rubber labyrinth 385 seals 380 positioned between the cover 230 and the ground surface 65.

Figure 13:
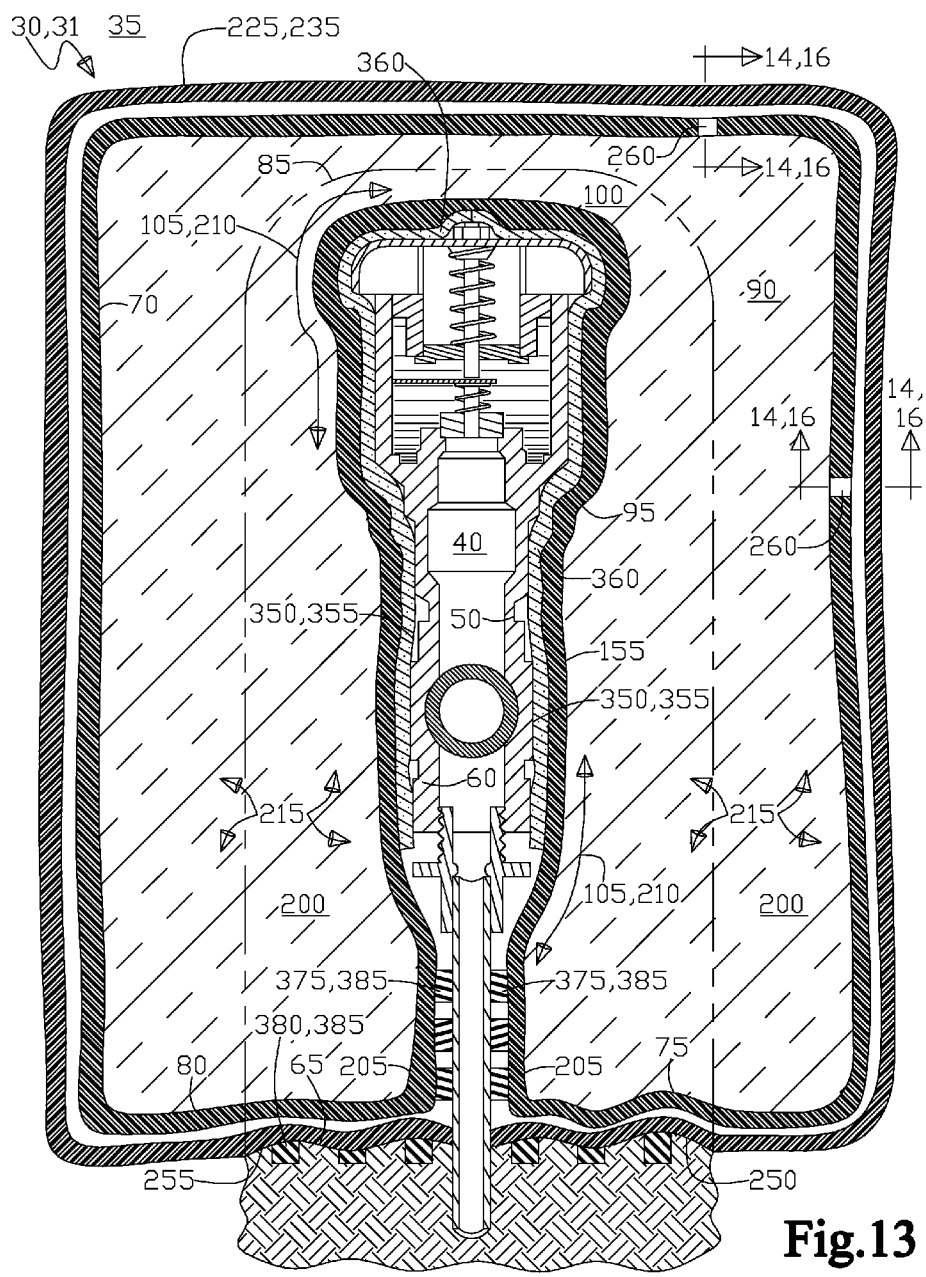
FIG. 13 is cross sectional view 13-13 from FIG. 9, wherein the differences in the insulation setups can be better shown from FIG. 9.

Continuing, FIG. 13 is cross sectional view 13-13 from FIG. 9, wherein the differences in the insulation setups can be better shown from FIG. 9, FIG. 13 shows what is termed the full fiberglass insulating assembly 30 or 31 which includes a single piece flexible inverted "U" shaped 100 enclosure type arrangement to facilitate the needed free access to the plumbing component assembly 40. Wherein the flexible inverted "U" 100 shaped enclosure contains fiberglass insulation 200 disposed within a multiple small slit 260 vented plastic bag 70, thus the plastic bag 70 is filled with fiberglass insulation 200 and the bag 70 is bent about each side of the plumbing component assembly 40 as shown in the "U" shape 100, with the pressure 295 and 340 activated venting 260 to be open 320 allowing interior 90 trapped air 330 to escape to the exterior environment 35, thus allowing the "U" shaped 100 bag to have its interior 90 filled with fiberglass insulation 200. Wherein next with the venting 260 closed 325 without the presence of interior 90 pressure 295, thus the fiberglass insulation 200 having the ability to flexibly mold itself 210 around the unique plumbing component assembly 40 exterior surface 45 to minimize any open air spaces adjacent to the plumbing component assembly 40. Further, directly adjacent to the siphon valve housing 41 and the ball valve housings 47 and 48 is a layer of reflective 350 foil 355 backed by a one-eighth inch layer of flexible closed cell foam 360 that is adhered to each side of the inverted "U" shape 100 as shown. Also a flexible cover 235 is placed around the inverted "U" shaped 100 bag 70 to hold the inverted "U" shaped 100 bag 70 adjacent to the exterior surface 45 plumbing component assembly 40 with another plurality of rubber labyrinth 385 seals 380 positioned between the cover 235 and the ground surface 65.

Figure 14:
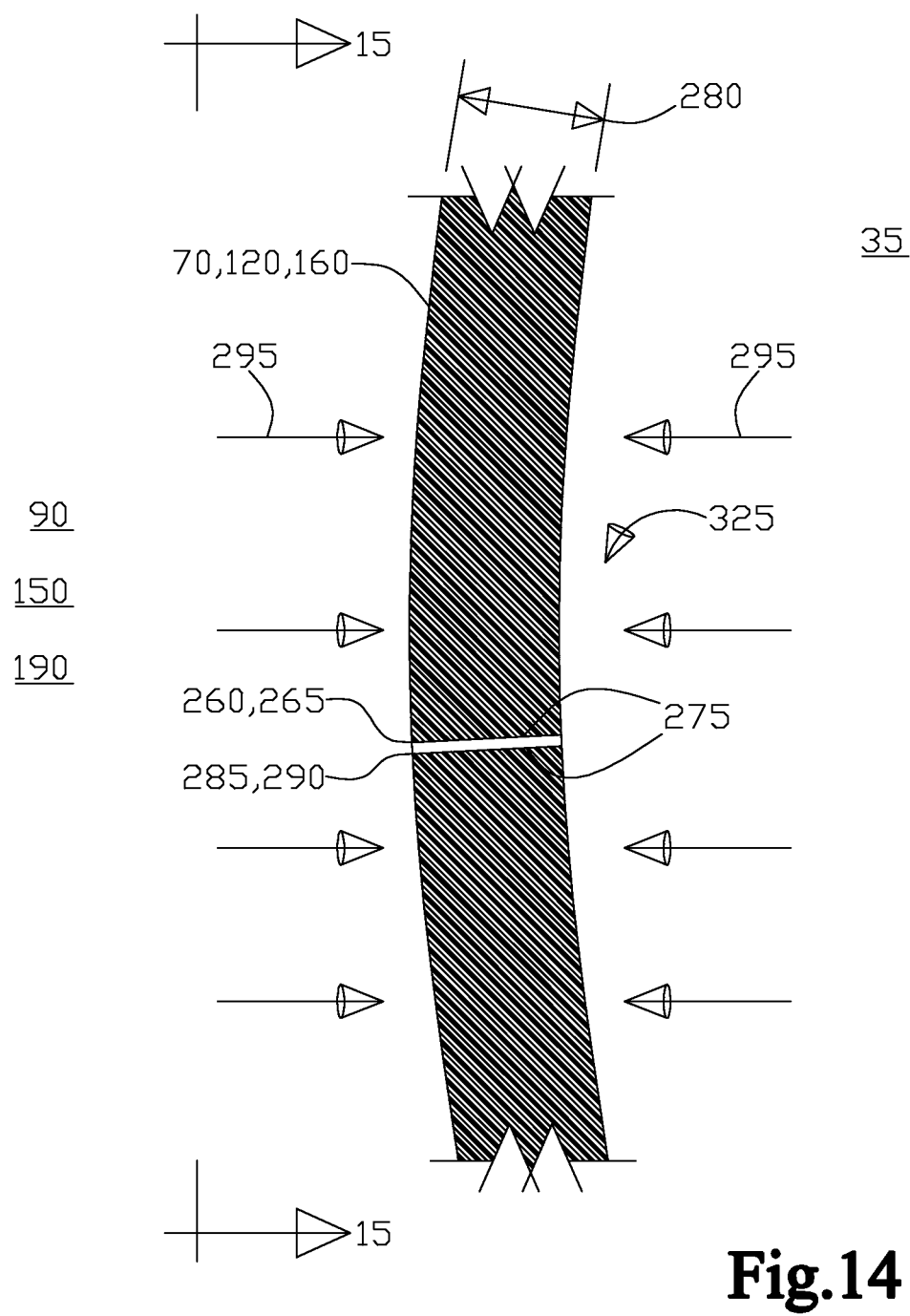
FIG. 14 is the cross sectional view 14-14 from FIGS. 12 and 13 showing the slit vent in the substantially closed operational state due to the absence of differential pressure as across the plastic bag in cross section, wherein the slit is in a substantially closed operational state when there is a lack of differential pressure across the opposing surfaces and due to the resilient nature of the plastic bag placing the slit edges adjacent to one another.
Figure 15:
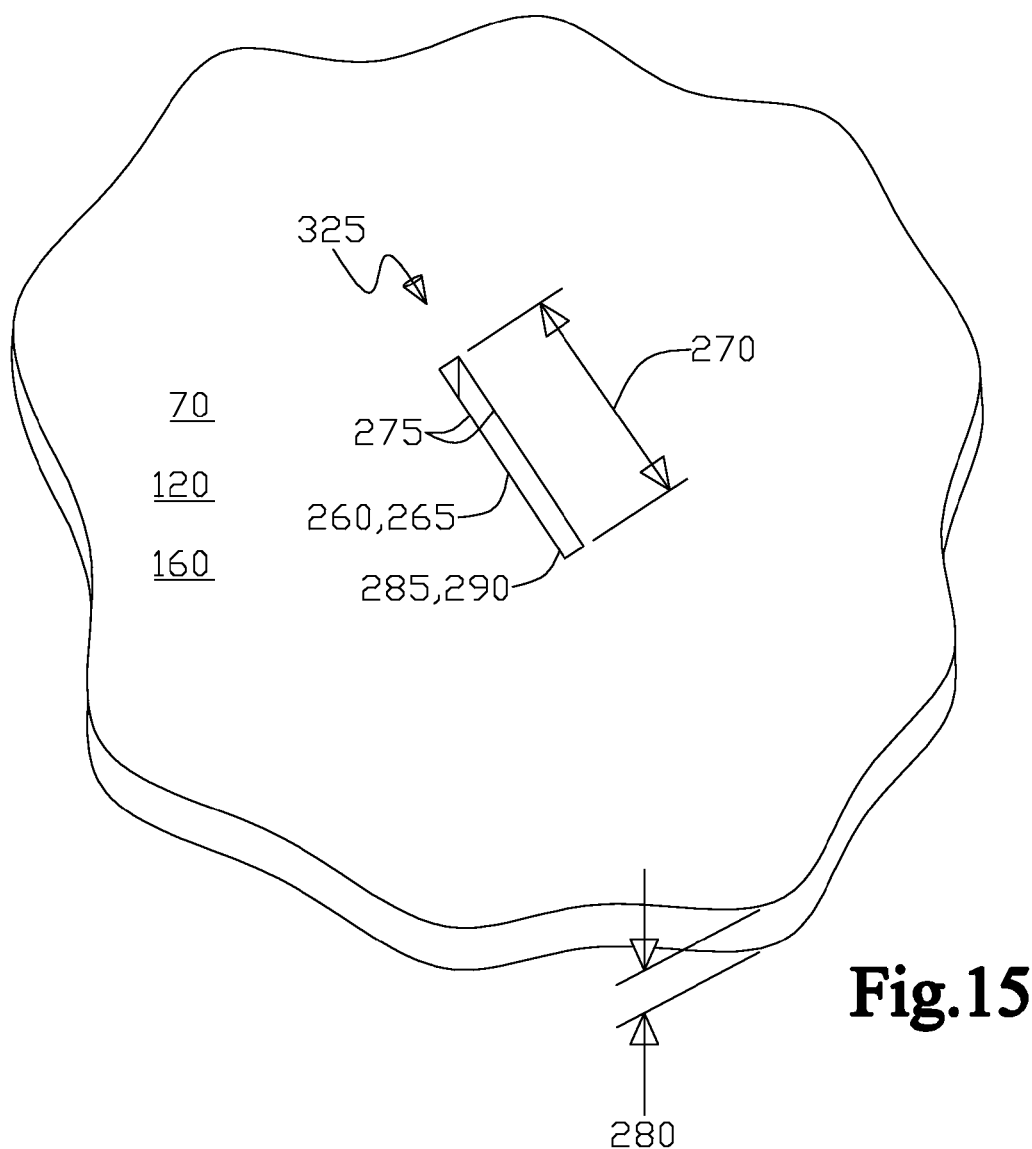
FIG. 15 is view 15-15 from FIG. 14 showing a surface view of the slit in the substantially closed operational state with the absence of differential pressure applied to the opposing surfaces of the plastic bag.
Figure 16:
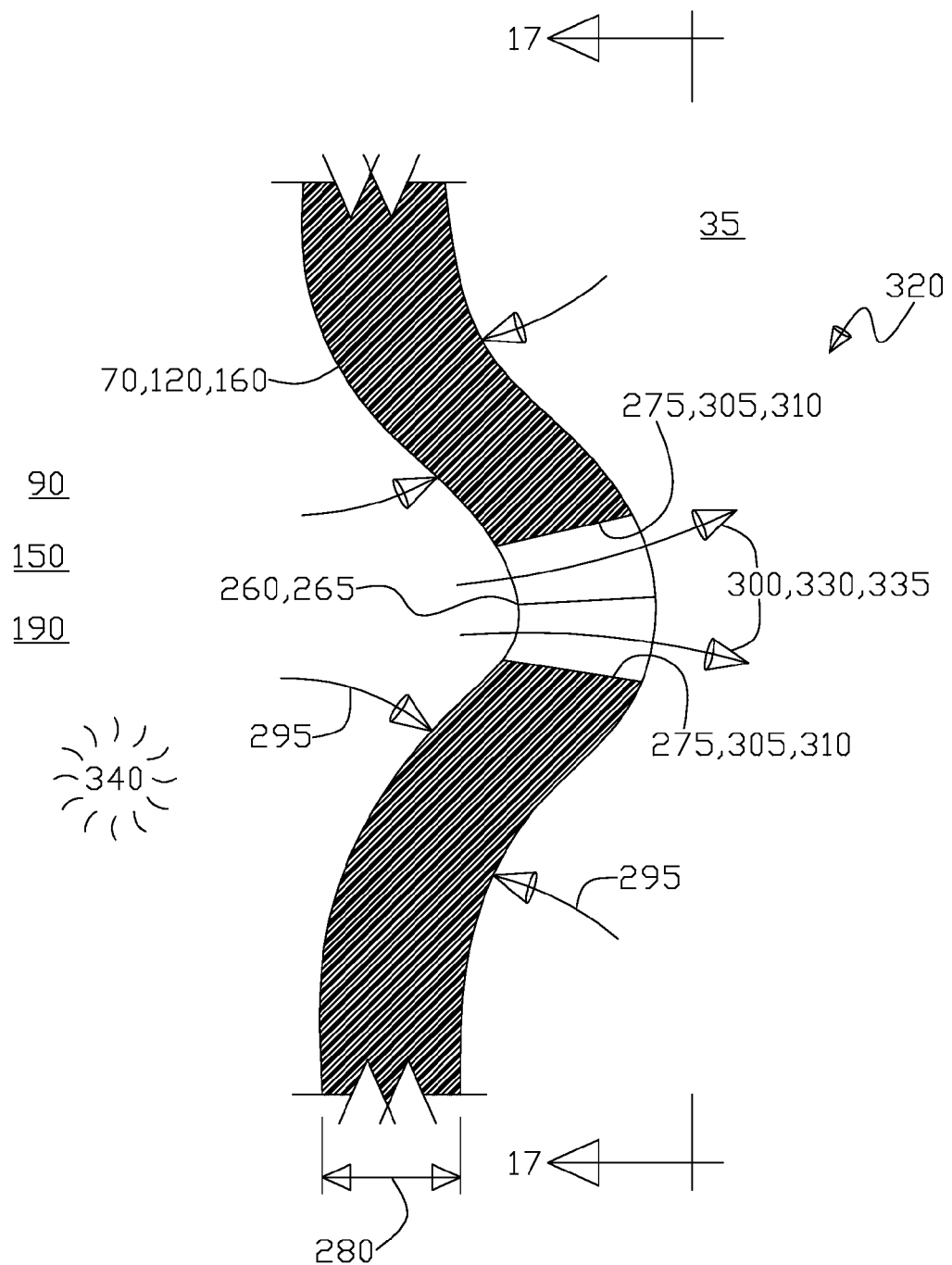
FIG. 16 is the cross sectional view 16-16 from FIGS. 12 and 13 showing the slit vent in the substantially open operational state due to the presence of differential pressure as across the plastic bag in cross section, wherein the slit is in a substantially open operational state when there is a differential pressure across the opposing surfaces and due to the resilient nature of the plastic bag placing the slit edges apart from one another thus allowing air flow therethrough in going from the interior to the external environment.

Yet further, FIG. 14 is the cross sectional view 14-14 from FIGS. 12 and 13 showing the slit 265 vent in the substantially closed 325 operational state due to the absence of differential pressure 295 as across the plastic bag 70 or 120 and 160 in cross section, wherein the slit 265 is in a substantially closed 325 operational state when there is a lack of differential pressure 295 across the opposing surfaces 275 and due to the resilient nature of the plastic bag 70 or 120 and 160 placing the slit edges or margins 275 adjacent to one another 285 in a normal or default positional closed 325 operational state. Moving to FIG. 15 is view 15-15 from FIG. 14 showing a surface view of the slit 265 again in the substantially closed 325 operational state with the absence of differential pressure 295 applied to the opposing surfaces of the plastic bag 70 or 120 and 160. Continuing, FIG. 16 is the cross sectional view 16-16 from FIGS. 12 and 13 showing the slit 265 vent in the substantially open 320 operational state due to the presence of differential pressure 295 as across the plastic bag 70 or 120 and 160 in cross section. Wherein the slit 265 is in a substantially open 320 operational state when there is a differential pressure 295 across the opposing surfaces and due to the resilient nature of the plastic bag 70 or 120 and 160 placing the slit 265 margin edges 275 apart 305 from one another thus allowing air flow 330 therethrough 300 in going from the interior 90 or 150 and 190 to the external environment 35.

Figure 17:
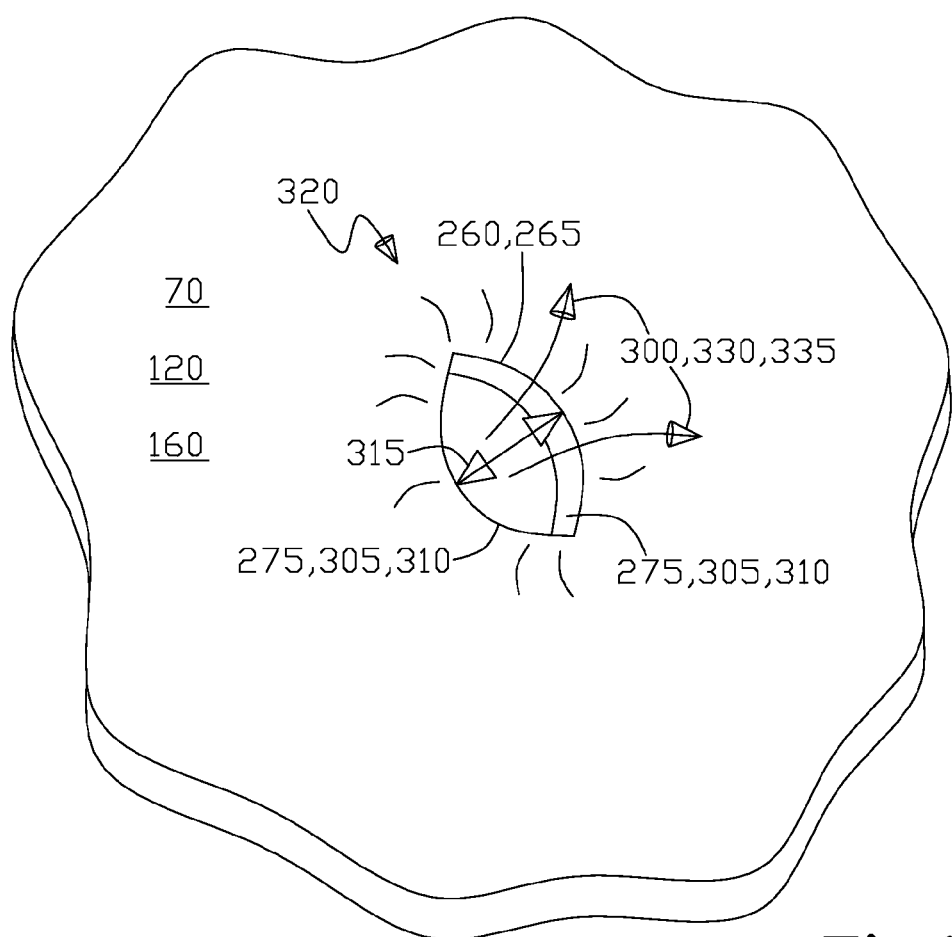
FIG. 17 is view 17-17 from FIG. 16 showing a surface view of the slit in the substantially open operational state with the presence of differential pressure applied to the opposing surfaces of the plastic bag thus placing the slit edges apart from one another and allowing air flow therethrough.
Figure 18:
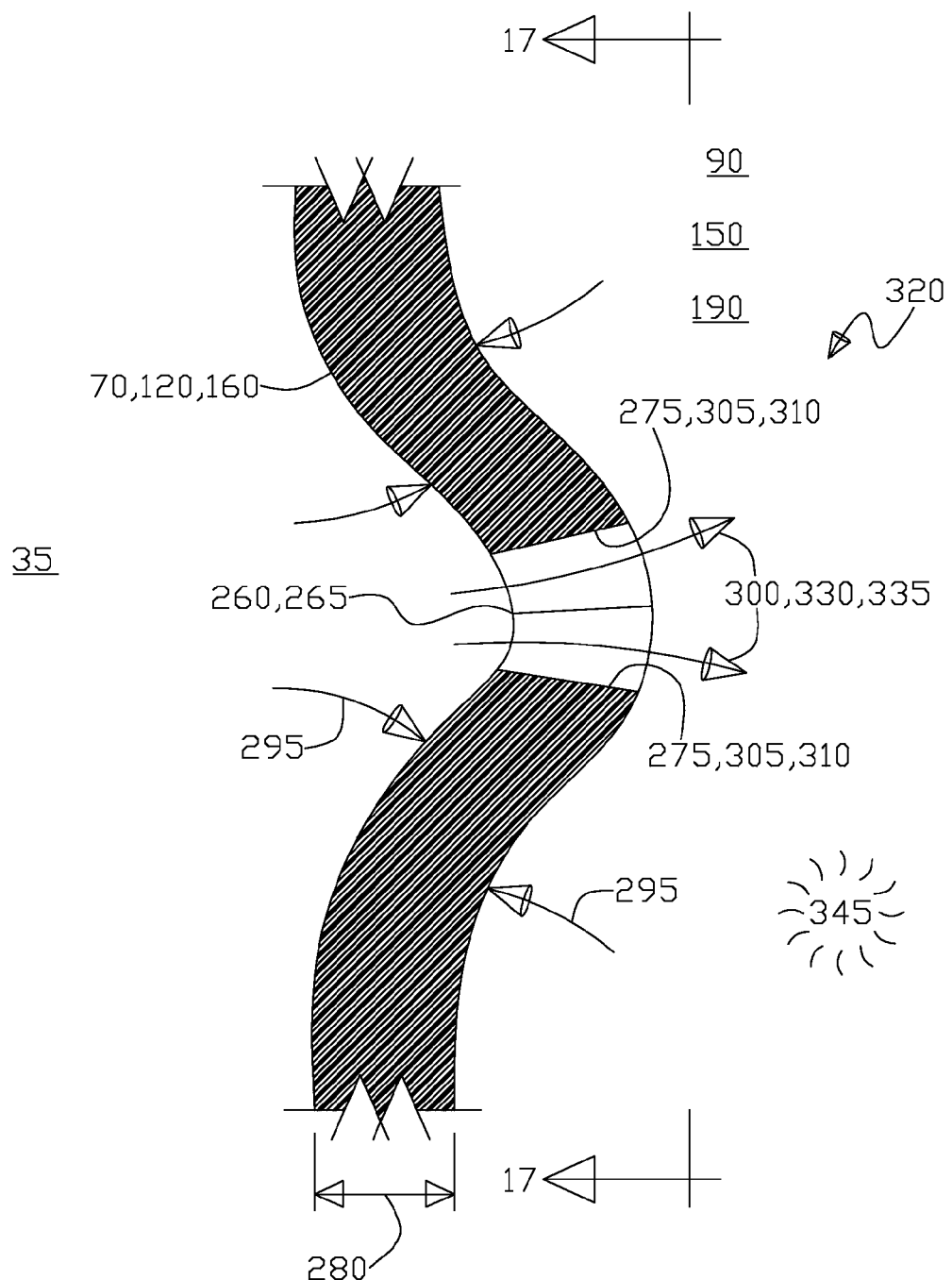
FIG. 18 is the cross sectional view 16-16 from FIGS. 12 and 13 showing the slit vent in the substantially open operational state due to the presence of differential pressure as across the plastic bag in cross section, wherein the slit is in a substantially open operational state when there is a differential pressure across the opposing surfaces and due to the resilient nature of the plastic bag placing the slit edges apart from one another thus allowing air flow therethrough in going from the external environment to the interior.

Next, FIG. 17 is view 17-17 from FIG. 16 showing a surface view of the slit 265 in the substantially open 320 operational state with the presence of differential pressure 295 applied to the opposing surfaces of the plastic bag 70 or 120 and 160 thus placing the slit 265 margin 275 edges apart from one another and allowing air flow 330 therethrough 300 in going from the interior 90 or 150 and 190 to the exterior environment 35 with pressure differential 340. Further, FIG. 18 is the cross sectional view 16-16 from FIGS. 12 and 13 showing the slit 265 vent in the substantially open 320 operational state due to the presence of differential pressure 295 as across the plastic bag 70 or 120 and 160 in cross section, wherein the slit 265 is in a substantially open 320 operational state when there is a differential pressure 295 across the opposing surfaces 70 or 120 and 160 and due to the resilient nature of the plastic bag placing the slit 265 margin 275 edges apart from one another thus allowing air flow 330 therethrough 300 in going from the external environment 35 to the interior 90 or 150 and 190 with differential pressure 345.

Figure 19:
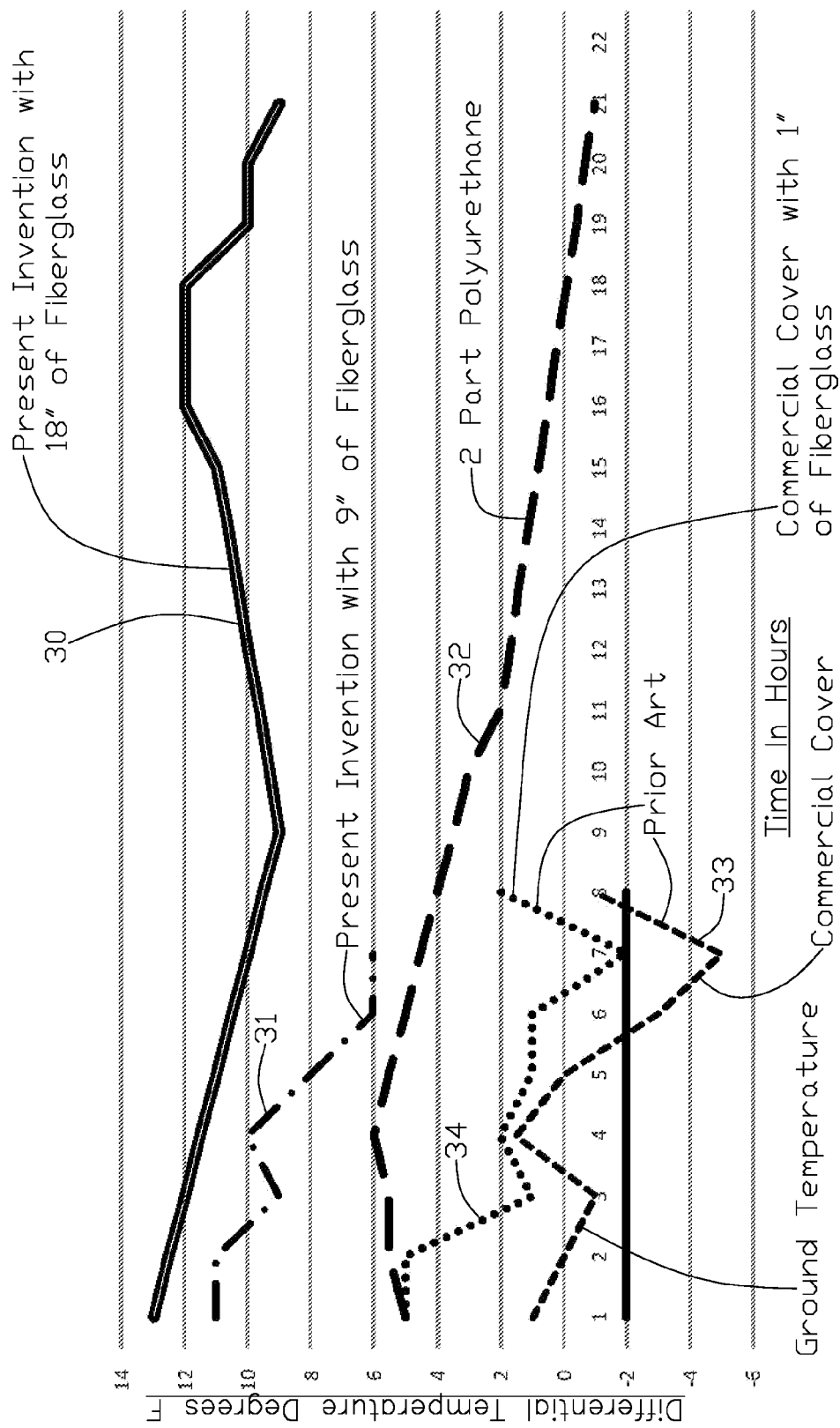
FIG. 19 shows test data from the various insulation test setups as shown in FIGS. 10, 11, 12, and 13 with the data taken with the plumbing component assembly naked, as shown in FIG. 7, in that there was no siphon vent valve to the external environment in place for several reasons being to allow the temperature sensing capsule to be inserted into the siphon valve housing, also to allow visual observation of the water in the housing going from liquid to slush to frozen solid, and further to make a more conservative case for the testing, in that the water would freeze slightly faster with the siphon vent valve removed due to increased convection across the free and open water surface in the siphon valve housing, what is basically shown is the differential temperature in degrees Fahrenheit in the "Y" or vertical axis, with the differential temperature being between ambient temperature and the temperature of the water disposed within the siphon valve housing, such that when the curve for the particular insulation type is above zero the siphon valve water is that much warmer in degrees than the ambient temperature and further when the curve for the particular insulation type goes below the zero line then the siphon valve water is that many degrees below ambient temperature which can happen when the ambient temperature warms from say for instance sunlight and the siphon valve being in an insulated enclosure warms more slowly than the ambient temperature, and further elapsed time in hours is on the "X" or horizontal axis, note that the elapsed time only starts when the ambient temperature goes down to freezing or thirty-two degrees Fahrenheit, as it is from this point onward that the insulated cover comes into importance in protecting the siphon valve from freezing, as at any ambient temperature above freezing, an insulating cover is not needed, the ground temperature is put in as a reference being consistently below the ambient temperature by a small amount, wherein the test performance of the other insulation improves as the curves extend upward and remain above the zero line as the curve extends to the right resulting in the ambient being able to go to a lower level for a longer period before the siphon valve.

Continuing, FIG. 19 shows test data from the various insulation test setups as shown in FIGS. 10, 11, 12, and 13 with the data taken with the plumbing component assembly 40 naked or without any form of insulation 200, in that there was no anti-siphon vent valve 46, wherein the anti-siphon valve 41 lower housing 39 and ball valves 47 and 48 are all in place holding the water 59, see FIGS. 7 and 9, all in the external environment 35. Thus, this current testing arrangement allows the temperature sensing capsule 61 to be inserted into the anti-siphon valve 41 lower housing 39, also to allow visual observation of the water 59 in the lower housing 39 going from liquid to slush to frozen 58 solid. Also, further to make a more conservative case for the testing heat transfer wise, in that the water 59 would freeze slightly faster with the siphon vent valve 46 removed due to increased convection across the free and open water 59 surface 64 in the siphon valve lower housing 39, this as opposed to the slightly reduced convection that would occur with the anti-siphon vent valve 46 in place. Resulting in there being somewhat more heat transfer during the testing setup as shown in FIGS. 7 and 9 in comparison to the actual plumbing assembly and insulation setup as shown in FIGS. 10 through 13.

Referring back to FIG. 19, what is basically shown is the differential temperature in degrees Fahrenheit in the "Y" or vertical axis, with the differential temperature being between ambient temperature 66 and the temperature 63 of the water 59 disposed within the siphon valve lower housing 39. Such that when the curve for the particular insulation type (corresponding to a specific embodiment) being 30, 31, 32, 33, or 34 is above zero on the "Y" axis, the siphon valve lower housing 39 water 59 is that much warmer in degrees Fahrenheit 63 than the ambient temperature 66 and further when the curve for the particular insulation type being 30, 31, 32, 33, or 34 goes below the zero line on the "Y" axis then the siphon valve lower housing 39 water 59 is that many degrees Fahrenheit 63 below ambient temperature 66 which can happen when the ambient temperature 66 warms from say for instance sunlight and the siphon valve lower housing 39 being in an insulated enclosure warms more slowly than the ambient temperature 66. Further, in FIG. 19 the elapsed time in hours is on the "X" or horizontal axis, note that the elapsed time only starts when the ambient temperature 66 goes down to freezing or thirty-two degrees Fahrenheit, as it is only from this point onward that the insulated cover being 30, 31, 32, 33, or 34 comes into importance in protecting the anti-siphon valve 41 from freezing and failing, as at any ambient temperature 66 above freezing, an insulating cover is not needed for the plumbing assembly 40. For the entire test temperature cycle, the mid day ambient 66 was typically fifty to sixty degrees Fahrenheit (which is when the sprinkler system would typically be operational, this is the point, wherein the insulation embodiment being one of 30, 31, 32, 33, or 34 would be added to the plumbing components 40, so the plumbing components 40 would initially be at the ambient temperature 66 of fifty to sixty degrees Fahrenheit, thus when the ambient temperature 66 would drop through the night typically into the mid-twenties in degrees Fahrenheit, the real test of the insulation 30, 31, 32, 33, or 34 was to restrict the heat loss transfer from the plumbing components to the external environment 35 over time.

Continuing in FIG. 19, the ground temperature 68 is put in as a reference being consistently below the ambient temperature 66 by a small amount, thus to ascertain the effect of the heat transfer along the typically copper pipe 51 into the ground as transferred from the ambient environment 35, which could lead to the water 50 freezing 58 within the pipe 51, however, as testing observation had shown the anti-siphon valve 41 to be the weak link for failure when the water 50 froze 58 in the plumbing component assembly 40 being primarily due to its larger surface area that is exposed to the freezing water resulting in more force place against the valve 41 coupled with its weaker construction materials as previously discussed, thus make the anti-siphon valve 41 the focus of protection from freezing.

Further in FIG. 19, the preferred performance of the test insulation embodiments being 30, 31, 32, 33, or 34 is to have a particular embodiment's test performance curve be the farthest above zero on the "Y" axis and to stay above this zero line for the longest time in the curve going to the right side of the graph. Or in other words, the test performance of the insulation improves as the curves extend upward and remain above the zero line as the curve extends to the right resulting in the ambient temperature 66 being able to go to a lower level for a longer period of time before the anti-siphon valve freezes 41. In looking at the test results, it can be seen that the embodiment 30 performed the best, i.e. such that if one were to say that the valve 41 water 59 temperature is staying about ten degrees Fahrenheit on average above the ambient temperature 66 for over twenty hours, this would mean that the ambient temperature 66 could get to almost twenty-two degrees Fahrenheit for over twenty hours before there is risk of the anti-siphon valve 41 sustaining freezing damage. This should protect the anti-siphon valve 41 from freezing damage for a change of season overnight freeze before the insulation embodiment 30 could be removed and the plumbing components 40 properly winterized, as shown in FIG. 4, thus the embodiment 30 should be installed upon the plumbing components 40 when the sprinkler system is operation, as in FIG. 2, when there is risk of seasonal change freezing weather (spring and fall) wherein the embodiment 30 can be removed from the plumbing components 40 when either there is no risk of freezing (spring) of the system is properly winterized 4 (fall).

Also, in FIG. 19, for the other embodiments 31, 32, 33, and 34 that performed less well than embodiment 30, the reasons are as follows, as embodiments 30 and 31, see FIG. 13, were identical except for the amount of insulation 200, with embodiment 30 having two parallel layers of R30 rated fiberglass wool and embodiment 31 having on layer of R30 rated fiberglass wool. Further, embodiment 32, see FIG. 12, was the two piece clamshell 205 arrangement of the 2-part polyurethane mix, wherein the polyurethane mix is a good closed cell foam insulator, the problem of heat loss at the clam shell interface 205 proved to take away the advantages heat transfer wise of the polyurethane. The other two embodiments 33 and 34 being the thin fold-over commercial cover showed the poor performance that air spaces 71, see FIG. 10 especially, can cause, wherein the elimination of some of the air space 71 with the thin layer of fiberglass wool 72 added in embodiment 34 does have some improvement in reducing heat transfer. Based on this information taken from the test results in FIG. 19, the importance of removing air space was noted in improving performance through reduced heat transfer, this is why the venting 260 was developed that could open 320 upon pressure 340 to reduce the interior 90, or 150 and 190 air space, thus allowing the insulation 200 to fill the interiors and as the insulation 200 expanded 215 the venting 260 would allow air to flow 330 in the opposite direction from the pressure 345, and when the insulation 200 was not expanding 215 the venting 260 would automatically substantially close 325 to help prevent the ingress of moisture from the external environment 35 to the insulation 200 so as to not degrade the insulation 200 heat transfer effectiveness.

Figure 20:
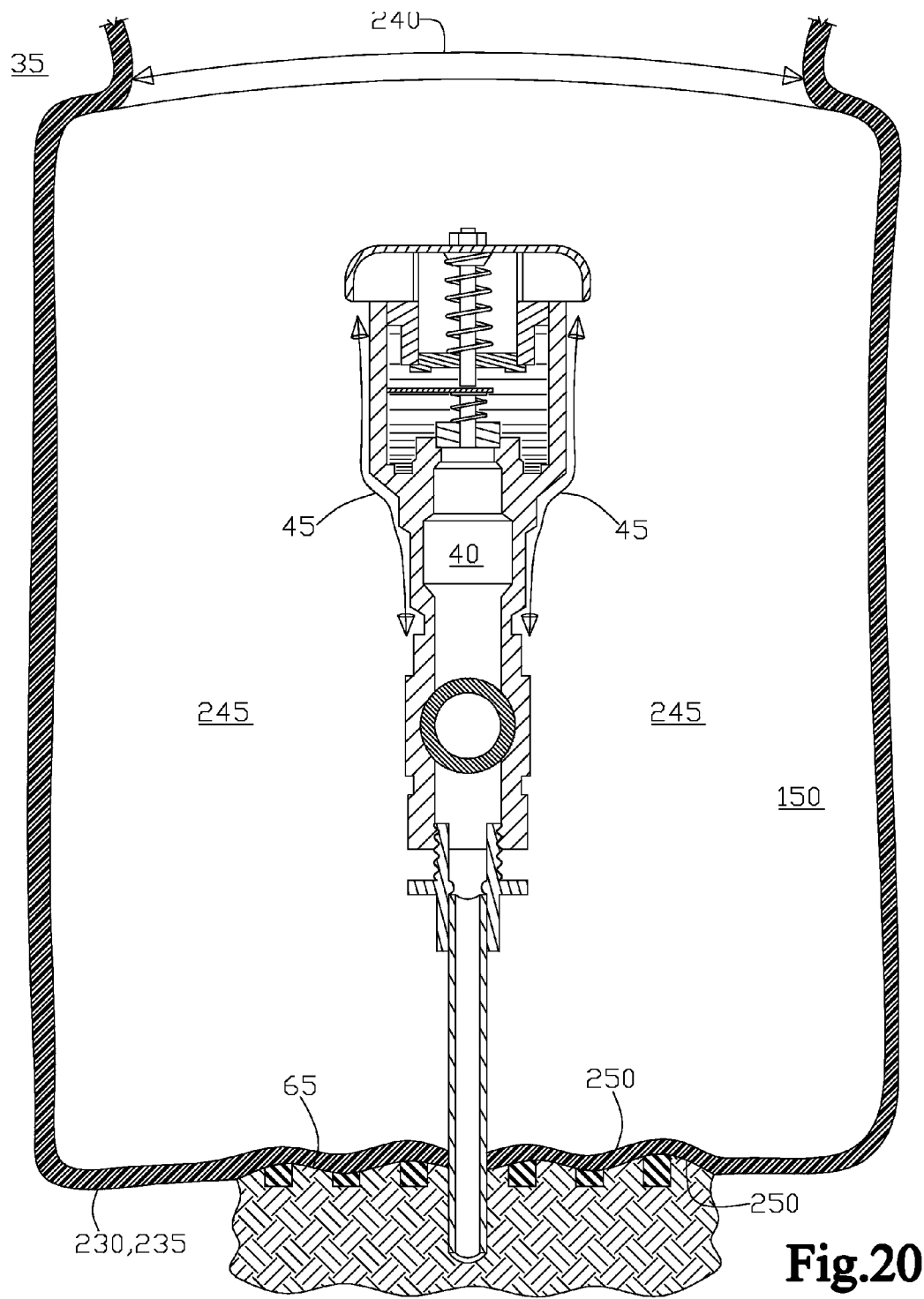
FIG. 20 is a portion of the method of installing the heat transfer apparatus depiction showing the cover placed or positioned about the article of plumbing component assembly leaving an open space around the article and also showing the open ended enclosure at the top of the article, wherein the opposing end of the cover is in contact with the panel.

Moving ahead to FIG. 20 is a portion of the method of installing the self contained heat transfer apparatus 30, 31, or 32 with a depiction showing the cover 230 or 235 placed or positioned about the article of plumbing component assembly 40 leaving an open space 245 around the article 40 and also showing the open ended enclosure 240 at the top of the article 40, wherein the opposing end portion or fraction 250 of the cover 230 or 235 is in contact with the panel 65 or ground surface in this case. Next, FIG. 21 is also a portion of the method of installing depiction for embodiment 32 showing the cover 230 placed or positioned about the article of plumbing component assembly 40 leaving an open space 245 around the article 40 and also showing the open ended enclosure 240 at the top of the article 40, wherein the opposing end portion of fraction 250 of the cover 230 is in contact with the panel 65 or ground surface as in FIG. 20 and further showing the insertion of the first 120 and second 160 surrounding sidewalls disposed within the open space 245 to in effect have the clam shell 205 about the article 40 with the first 130 and second 170 closures shown in the open state 135 and 175 respectively. Next, to FIG. 22 is again a portion of the method of installing embodiment 30 or 31 depiction showing the cover 235 placed or positioned about the article of plumbing component assembly 40 leaving an open space 245 around the article 40 and also showing the open ended enclosure 240 at the top of the article 40, wherein the opposing end of the cover 235 is in contact with the panel 65 or ground surface as in FIG. 20 and further showing the insertion of the surrounding sidewall 70 partially disposed 110 within a portion of the open space 245 wherein a remaining portion 115 of the surrounding sidewall 70 is freely protruding outside of the cover 235 open space portion 245.

Broadly, and focusing in particular on FIGS. 12, 14 through 18, 20, and 21, the present invention is of a heat transfer reduction apparatus 32 is for an article 40, with the article 40 having a unique convoluted exterior surface 45. The heat reduction transfer apparatus 32 includes a first flexible surrounding sidewall 120 that has a first base 125, and an oppositely disposed first closure 130. Further the first surrounding sidewall 120 includes a first sidewall periphery 140 and a perpendicularly oriented first distance 145 as between the first base 125 and the first closure 130. Wherein the first sidewall 120, the first base 125, and the first closure 130 all act to define a first interior 150, wherein a portion 155 of the first surrounding sidewall 120 is in contact with a first portion 55 of the exterior surface 45 of the article 40, as best seen in FIGS. 12 and 21. Further included in the heat transfer reduction apparatus 32 is a second flexible surrounding sidewall 160 that has a second base 165, and an oppositely disposed second closure 170, further the second surrounding sidewall 160 includes a second sidewall periphery 180 and a perpendicularly oriented second distance 185 as between the second base 165 and the second closure 170. Wherein the second sidewall 160, the second base 165, and the second closure 170 all act to define a second interior 190, wherein a portion 195 of the second surrounding sidewall 160 is in contact with a second portion 60 of the exterior surface 45 of the article 40, again as best seen in FIGS. 12 and 21.

Further included in the heat transfer reduction apparatus 32 is a moldable insulating material 200 disposed within the first interior 150 and the second interior 190 via the first closure 130 and the second closure 170 respectively, see FIG. 12. Wherein the first surrounding sidewall 120 and the second surrounding sidewall 160 form a separable clamshell interface 205 arrangement to one another about the article 40 exterior surface 45, again see FIG. 12. Wherein the first surrounding sidewall 120 and the second surrounding sidewall 160 allows the moldable insulating material 200 to be substantially conforming in a custom manner 105 about the article 40 unique convoluted exterior surface 45, as FIG. 12 shows. Additionally, the heat transfer reduction apparatus 32 includes a means 220 for removably retaining the first surrounding sidewall 120 and the second surrounding sidewall 160 to one another in the clamshell arrangement 205 about the article 40 exterior surface 45, see FIGS. 12 and 21.

Further the heat transfer reduction apparatus 32 for an article 40 can include in the first surrounding sidewall 120 and the second surrounding sidewall 160 the plurality of apertures 260 therethrough, with the apertures 260 being operational to allow the passage 335 of air 330 therethrough the first surrounding sidewall 120 and the second surrounding sidewall 160 to further allow 215 the moldable insulating material 200 to substantially fill the first 150 and second 190 interiors to minimize the occurrence of open air spaces within the first 150 and second 190 interiors to benefit the heat transfer performance as previously described, see FIGS. 12, and 14 through 18 in particular. Next, in focusing on FIGS. 14 through 18, for the heat transfer reduction apparatus 32 for an article 40 the plurality of apertures 260 can each in the shape of a slit 265. Continuing, the slit 265 is formed via a sharp ended knife, wherein the slit 265 has a length 270 and a pair of opposed adjacent margin edges 275 that are at the length 270, wherein the margin edges 275 have a thickness 280 equal to a thickness of the first 120 and second 160 surrounding sidewalls. Wherein the margin edges 275 are normally urged 285 into a closed state 325 with the margin edges 275 being substantially adjacent 290 to one another and yieldable into the open state 320 when the slit 265 is exposed to a pressure differential 295 between first 150 and second 190 interiors and the external environment 35, wherein the open state 320 occurs when the margin edges 275 are separated 310 from one another allowing air flow 330 therethrough 335.

Continuing, to focus on FIGS. 12, 14 through 18, and 21, wherein alternatively the length 270 is size limited such that when the first 120 and second 160 surrounding sidewalls have a pressure 340 within the first 150 and second 190 interiors greater than the external environment 35 from the moldable insulating material 200 being disposed within and expanding within the first interior 150 and the second interior 190 such that the opposed margin edges 275 in the open state 320 are separated 315 by no more than about seventy five-thousandths (0.075) of an inch, being operational to limit seeping of the moldable insulating material 200 therethrough the slits 265, as best shown in FIG. 17. Also, for a preferred density area wise for the plurality of slits 265, has a per unit area preferred density in the first 120 and second 160 surrounding sidewalls defined by each slit 265 length 270 (in conjunction with the separation 315 preference), see FIG. 15, summed together to form a total dimensional number in the area, with the area defined as being a product number of the first periphery 140 multiplied by the first distance 145 or the second periphery 180 multiplied by the second distance 185, wherein the total dimensional number is at least two (2) times the product number. As an example of the aforementioned calculation, based on the resilience for the first 120 and second 160 sidewalls being typically preferred as flexible plastic sheeting and with separation distance 315 being about 0.075 inches, see FIG. 17, an implied length 270 of about one-eighth inch, see FIG. 15, results in the following from the test data; the periphery 140 or 180 was equal to about forty-eight inches and the distance 145 or 185 of about eighteen inches. The calculation would be 48 multiplied by 18 equals 864 for the product number, wherein 2 times 864 (product number) equals 1728, wherein this number is divided by slit 265 length 270 of 0.125 inches to equal at least 13,824 slits 265 for either the first 120 or second 160 sidewall, or alternatively sixteen (16) slits 265 per square inch of area of either first 120 and second 160 surrounding sidewalls.

Moving toward the moldable insulating material 200 for embodiment 32 in FIG. 12, it is preferably constructed of a polyurethane intermediate that is further preferably constructed from a polymeric, a polyols, and a hydrocarbon gas mixture, as is typically available in an aerosol can as manufactured by DOW having brand name GREAT STUFF in a 16 ounce can or a suitable equivalent forming an expanded closed cell rigid foam from a liquid. Optionally, preferably for the insulating material 200 for embodiment 32 the moldable insulating material 200 is constructed of a two part polyurethane mix, that can be from FORSCH POLYMER CORP., utilizing for the first part model number POL 7030B and for the second part model number ISO 200A, wherein the first part and the second part are mixed as equal volumetric parts of liquid that react to one another to expand to form a rigid closed cell foam, or a suitable equivalent.

Continuing for the heat transfer reduction apparatus 32 wherein the means 220 for removably retaining the first surrounding sidewall 120 and the second 160 surrounding sidewall is a removably engagable flexible outer cover 230 that substantially encloses the first 120 and second 160 surrounding sidewall portions that are not a part of the clamshell interface 205, as best shown in FIGS. 12 and 21. The cover 230 can be constructed of any flexible waterproof material, wherein the open ended enclosure 240 is facilitated via a removable section that can open and closed by zipper, hook and loop fastener, and the like.

As an additional option, for the heat transfer reduction apparatus 32, a flexible radiant barrier material layer 350 can be added that is affixed to a portion of the clamshell interface 205 of each of the first 120 and second 160 surrounding sidewalls in the area adjacent to the article 40 exterior surface 45, as shown in cross section in FIG. 12 to provide radiation reflection back into the article 40 exterior surface 45. Further, on the flexible radiant material layer, is preferably constructed of a reflective foil material 355 adjacent to the article 40 exterior surface 45 with an adhesive sided high density foam layer 360 positioned therebetween the foil 355 and the clamshell interface 205 of each of the first 120 and second 160 surrounding sidewalls. The preferred supplier for the radiant barrier material layer 350 is made by FROST KING termed a "Self-Adhesive Foil and Foam", having an R value of 2, that is in a sheet form being one-eighth inch thick, or a suitable equivalent.

As a further option for the heat transfer reduction apparatus 32 with the clamshell interface 205 can further comprises a means 365 for sealing in-between the first 120 and second 160 surrounding sidewalls at the clamshell interface 205, as shown in FIG. 12. More particularly, for the means 365 for sealing in-between the first 120 and second 160 surrounding sidewalls at the clamshell interface 205 is a removably engagable labyrinth seal 370, also as shown in FIG. 12. The labyrinth seal 370 is preferably manufactured by M-D Building Products identified as "All Climate Rubber Weatherseal" that has an adhesive backing on a smooth side that is about one-half inch wide and about one-quarter inch thick formed in a lengthwise strip, with the side of the strip that is oppositely positioned from the adhesive side having a plurality of lengthwise ridges and channels that are about one-eighth inch deep that form the labyrinth, further with the strip being affixed to the first 120 and second 160 sidewalls as a plurality of juxtapose strips to form a labyrinth on a labyrinth such that not only the ridges and channels form a labyrinth, but the plurality of strips form an additional labyrinth.

Figure 22:
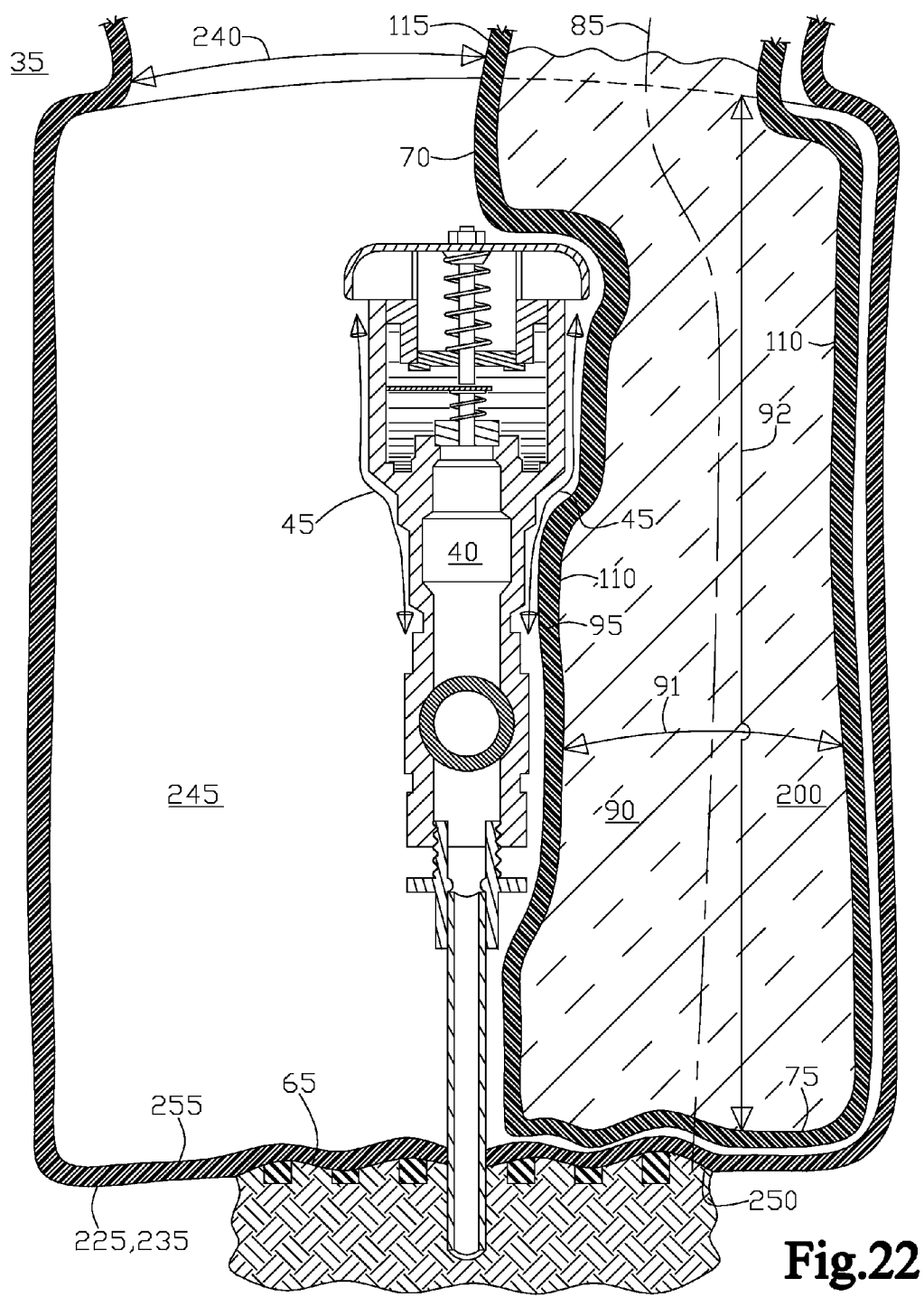
FIG. 22 is again a portion of the method of installing the heat transfer apparatus depiction showing the cover placed or positioned about the article of plumbing component assembly leaving an open space around the article and also showing the open ended enclosure at the top of the article, wherein the opposing end of the cover is in contact with the panel as in FIG. 20 and further showing the insertion of the surrounding sidewall partially disposed within a portion of the open space wherein a remaining portion of the surrounding sidewall is freely protruding outside of the cover open space portion.

Looking to the other embodiments 30 and 31 as primarily shown in FIG. 13, and then for the installation FIGS. 20 and 22, wherein as previously mentioned embodiment 30 has two parallel layers of R30 value fiberglass wool and embodiment 31 has a single layer of R30 value fiberglass wool, wherein embodiments 30 and 31 of the heat transfer reduction apparatus for an article 40 extending from a panel 65, with again the article 40 having a unique convoluted exterior surface 45. Included in embodiments 30 and 31 is a flexible surrounding sidewall 70 including a primary base 75 and an oppositely disposed secondary base 80 with a longitudinal axis 85 spanning therebetween, wherein the sidewall 70, the primary base 75, and the secondary base 80 all act to define an interior 90. In addition, the sidewall 70 further includes a plurality aperture 260 slits 265 therethrough, wherein a portion 95 of the surrounding sidewall 70 is in contact with a portion 50 of the exterior surface 45 of the article 40.

Further, included in embodiments 30 and 31 is a moldable insulating material 200 disposed within the interior 90, wherein the surrounding sidewall 70 is formed into an inverted "U" configuration 100 along the longitudinal axis 85 resulting in a separable clamshell interface 205 arrangement about the article 40 exterior surface 45, see FIG. 13. Wherein the surrounding sidewall 70 with the moldable insulating material 200 substantially conforming 210 in a custom manner about the article 40 unique convoluted exterior surface 45, wherein the plurality of aperture 260 slits 265 are operable to vent excess air 330 in an open state 320 from the interior 90 to an external environment 35 to allow the moldable insulating material 200 to substantially fill 215 the interior 90 and substantially conform 210 to the article 40 unique convoluted exterior surface 45 in the inverted "U" configuration 100, thus minimizing the occurrence of the previously described undesirable air pockets in the interior 90 and adjacent to the exterior surface 45, that have a derogatory effect on the desired minimizing of heat transfer performance. Also included in embodiments 30 and 31 is a means 225 for removably retaining the surrounding sidewall 70 in the clamshell arrangement 205 about the article 40 exterior surface 45. More particularly, for the means 225 for removably retaining the surrounding sidewall 70 in the clamshell arrangement 205 is a removably engagable flexible outer cover 235 that substantially encloses the surrounding sidewall 70 that is not a part of the clamshell interface 205, as best shown in FIGS. 13, 20, and 22. The cover 235 can be constructed of any flexible waterproof material, wherein the open ended enclosure 240 is facilitated via a removable section that can open and closed by zipper, hook and loop fastener, and the like.

Next, in focusing on FIGS. 14 through 18, for the heat transfer reduction apparatus 30 and 31 for an article 40 the plurality of apertures 260 are each preferably be in the shape of a slit 265. Continuing, the slit 265 is formed via a sharp ended knife, wherein the slit 265 has a length 270 and a pair of opposed adjacent margin edges 275 that are at the length 270, wherein the margin edges 275 have a thickness 280 equal to a thickness of the surrounding sidewall 70. Wherein the margin edges 275 are normally urged 285 into a closed state 325 with the margin edges 275 being substantially adjacent 290 to one another and yieldable into the open state 320 when the slit 265 is exposed to a pressure differential 295 between interior 90 and the external environment 35, wherein the open state 320 occurs when the margin edges 275 are separated 310 from one another allowing air flow 330 therethrough 335.

Continuing to focus on FIGS. 13, 14 through 18, and 22, wherein alternatively the length 270 is size limited such that when the surrounding sidewall 70 have a pressure 340 within the interior 90 greater than the external environment 35 from the moldable insulating material 200 being disposed within and expanding within the interior 90 such that the opposed margin edges 275 in the open state 320 are separated 315 by no more than about seventy five-thousandths (0.075) of an inch, being operational to limit seeping of the moldable insulating material 200 therethrough the slits 265, as best shown in FIG. 17. Also, for a preferred density area wise for the plurality of slits 265, has a per unit area preferred density in the surrounding sidewall 70 defined by each slit 265 length 270 (in conjunction with the desired separation 315), see FIG. 15, summed together to form a total dimensional number in the area, with the area defined as being a product number of the periphery 91 multiplied by the distance 92, wherein the total dimensional number is at least two (2) times the product number. As an example of the aforementioned calculation, based on the resilience for the sidewall 70 being typically preferred as flexible plastic sheeting and with separation distance 315 being about 0.075 inches, see FIG. 17, an implied length 270 of about one-eighth inch, see FIG. 15, results in the following from the test data; the periphery 91 was equal to about forty-eight inches and the distance 92 of about eighteen inches. The calculation would be 48 multiplied by 18 equals 864 for the product number, wherein 2 times 864 (product number) equals 1728, wherein this number is divided by slit 265 length 270 of 0.125 inches to equal at least 13,824 slits 265 for either the sidewall 70, or an equivalent of alternative of about sixteen (16) slits 265 per square inch of area of the surrounding sidewall 70.

Thus, for the heat transfer reduction apparatus 30 and 31, each of the plurality of aperture 260 slits 265 is normally urged into a substantially closed 325 state and yieldable into the open 320 state when each aperture 260 slit 265 is exposed to an air flow 330 caused by a pressure difference 295 as between the interior 90 and the external environment 35. Wherein the aperture 260 slit 265 is urged to return to the closed 325 state at a termination of the pressure difference 295, being operational to assist in the prevention of an ingress of moisture from the external environment 35 to the interior 90. Note that the pressure difference 295 can be either way, such that the slits 265 are placed into the open 320 state from the 340 pressure difference wherein the air 330 flow 335 is from the interior 90 to the external environment 35 or vice versa with the pressure difference 345 with the slits 265 placed in the open state 320 for air 330 flow 335 from the external environment 35 to the interior 90, in either case to facilitate the insulation 200 to expand and fill 215 the sidewall 70 and to mold around 210 the article surface 45, wherein both cases to minimize the undesirable air pockets to improve the heat transfer performance, i.e. less heat transfer equals better performance. Also for the heat transfer reduction apparatus 30 and 31 the moldable insulating material 200 is preferably constructed of a fiberglass wool that is self expanding, available from Owens Corning being an un-faced fiberglass wool sheet that is rated R30 value being about nine and one-half inches thick when expanded that is non-settling, non-water absorbing, and fireproof, or a suitable equivalent. Note that embodiment 30 uses two R30 layers of moldable insulating material and embodiment 31 uses a single layer of R30 moldable insulating material.

As an additional option, for the heat transfer reduction apparatus 30 and 31, a flexible radiant barrier material layer 350 can be added that is affixed to a portion of the clamshell interface 205 of each of the surrounding sidewall 70 in the area adjacent to the article 40 exterior surface 45, as shown in cross section in FIG. 13 for the purpose or reflecting radiation heat transfer back to the article 40 exterior surface 45. Further, on the flexible radiant material layer, it is preferably constructed of a reflective foil material 355 adjacent to the article 40 exterior surface 45 with an adhesive sided high density foam layer 360 positioned therebetween the foil 355 and the clamshell interface 205 of surrounding sidewall 70. The preferred supplier for the radiant barrier material layer 350 is made by FROST KING termed a "Self-Adhesive Foil and Foam", having an R value of 2, that is in a sheet form being one-eighth inch thick, or a suitable equivalent.

As a further option for the heat transfer reduction apparatus 30 and 31 with the clamshell interface 205 can further comprises a means 375 for sealing in-between the surrounding sidewall 70 at the clamshell interface 205, as shown in FIG. 13. More particularly, for the means 375 for sealing in-between the surrounding sidewall 70 at the clamshell interface 205 is a removably engagable labyrinth seal 385, also as shown in FIG. 13. The labyrinth seal 385 is preferably manufactured by M-D Building Products identified as "All Climate Rubber Weatherseal" that has an adhesive backing on a smooth side that is about one-half inch wide and about one-quarter inch thick formed in a lengthwise strip, with the side of the strip that is oppositely positioned from the adhesive side having a plurality of lengthwise ridges and channels that are about one-eighth inch deep that form the labyrinth, further with the strip being affixed to the sidewall 70 as a plurality of juxtapose strips to form a labyrinth on a labyrinth such that not only the ridges and channels form a labyrinth, but the plurality of strips form an additional labyrinth.

Note that the term "self contained heat transfer apparatus" 30, 31, and 32 is defined as an apparatus that needs no additional input in the form of any ancillary heat energy whatsoever, whether it is in the form of electrical, fuel based, sun, or any other form, as all embodiments 30, 31, or 32 of the present invention work to maintain the heat energy within the article (that is above the freezing threshold of water) for the longest period time with the least heat energy or temperature loss to the external environment 35 over time with ambient 35 temperature drop.

METHOD OF USE

Referencing in particular FIGS. 12, 20, and 21, a method is disclosed for the installing the self contained heat transfer reduction apparatus 32 about an article 40, with the article 40 having the unique convoluted exterior surface 45, that includes the steps of: firstly, providing a self contained heat transfer reduction apparatus 32 as previously defined. Secondly, as shown in FIG. 20, positioning the flexible outer cover 230 around the article 40 exterior surface 45 leaving open space 245 as between the article 40 exterior surface 45 and the cover 230, wherein the cover 230 forms an open ended enclosure 240 about the article 40 exterior surface 45. Note, also that a fraction 250 of the cover 230 can be positioned in contact with the panel 65 or the ground surface.

Thirdly, as shown in FIG. 21, placing the first surrounding sidewall 120 into the flexible outer cover 230 with the first base 125 feeding through the open ended enclosure 240 until the first surrounding sidewall 120 is disposed within a portion of the open space 245, wherein the first surrounding sidewall 120 is primarily in contact with a first portion 55 of the exterior surface 45 of the article 40 and a portion of the cover 230. Fourth, also as shown in FIG. 21, placing the second surrounding sidewall 160 into the flexible outer cover 230 with the second base 165 feeding through the open ended enclosure 240 until the second surrounding sidewall 160 is disposed within a remaining portion of the open space 245 that is not occupied by the first surrounding sidewall 120, wherein the second surrounding sidewall 160 is primarily in contact with a second portion 60 of the exterior surface 45 of the article 40 and a portion of the cover 230.

Fifth, again in referring to FIG. 21, positioning the first 120 and second 160 flexible surrounding sidewalls to be adjacent to one another, forming the clam shell interface 205, and with the flexible outer cover 230, and the article 40 exterior surface 45, wherein the first 130 and second 170 closures are in an open state 135 and 175 respectively, being ready to receive the moldable insulating material 200 next. Sixth, again in referring to FIG. 21 to start, disposing the moldable insulating material 200 within the first interior 150 and the second interior 190 via the first open 135 closure 130 and the second open 175 closure 170 respectively. Wherein the first surrounding sidewall 120 and the second surrounding sidewall 160 form a separable clamshell interface arrangement 205 to one another about the article 40 exterior surface 45. Wherein, now referring to FIG. 12, the first surrounding sidewall 120 and the second surrounding sidewall 160 with the moldable insulating material 200 substantially expanding 215 and conforming in a custom manner 210 about the article 40 unique convoluted exterior surface 45, with the plurality of slits 265 allowing air 330 venting 335 from the first 150 and second 190 interiors to the external environment 35 further allows the moldable insulating material 200 to substantially fill 215 the first 150 and second 190 interiors to minimize any previously discussed undesirable air voids disposed about the article 40 exterior surface 45 and elsewhere within the cover 230.

Referring in particular to FIGS. 13, 20, and 22, a method of installing the self contained heat transfer reduction apparatus 30 and 31 about an article 40 that extends from a panel 65, with the article 40 having a unique convoluted exterior surface 45, including the steps of: firstly providing a self contained heat transfer reduction apparatus 30 or 31 as previously defined. Secondly, looking specifically at FIG. 20, positioning a portion or fraction 250 of the cover 235 in contact with the panel 65 and placing a remaining portion of the cover 235 around the article 40 exterior surface 45 leaving an open space 245 as between the article 40 exterior surface 45 and the cover 235, wherein the cover 235 forms a selectably open ended enclosure 240 about the article 40 exterior surface 45.

Thirdly, looking specifically at FIG. 22, placing a portion of the sidewall 70 into a portion of the cover 235 open space 245 such that the primary base 75 of the surrounding sidewall 70 feeds into the portion of the cover 235 open space 245 through the open ended enclosure 240 with the primary base 75 feeding through the open ended enclosure 240 until the primary base 75 contacts a fraction 250 of the cover 230 portion contacting the panel 65, wherein a portion 110 of the sidewall 70 is disposed within the cover 235 open space portion 245 and a portion 115 of the sidewall 70 freely protrudes outside of the cover 235 open space portion 245.

Fourth, in going from FIGS. 22 to 13 by folding the freely 115 protruding sidewall 70 portion into a remaining portion of the cover 235 open space 245 such that the secondary base 80 is placed through the open ended enclosure 240 with the secondary base 80 feeding through the remaining cover 235 open space 245 portion until the secondary base 80 contacts a remaining fraction 255 of the cover 235 portion or fraction 250 contacting the pane 651, resulting in the sidewall 70 having an inverted "U" shape 100 along the longitudinal axis 85, see specifically FIG. 13. Wherein the folding step causes a pressure differential 295 as between the interior 90 and the external environment 35 facilitating air 330 to vent 335 from the interior 90 to the external environment 35 via the plurality of aperture 260 slits 265 further enabling a compression of the moldable insulating material 200 within the interior 90 caused by the folding step.

Continuing to refer to FIG. 13, sixth, in positioning the sidewall 70 to encase the article 40 exterior surface 45 and to substantially fill 215 the cover open space 245, wherein the insulation material 200 will expand 215 and cause a pressure differential 345 as between the interior 90 and the external environment 35 facilitating air 330 to vent 335 from the external environment 35 to said interior 90 via the plurality of aperture 260 slits 265, thus to minimize the open air spaces 71, see FIG. 10, that were shown to be so detrimental to heat transfer performance from the previously described testing. This air 330 ingress 335 from the external environment 35 to the interior 90 via the plurality of aperture 260 slits 265 further enables an expansion 215 of the insulating material 200 within the cover 235 open space 245, wherein when the insulating material 200 ceases to expand 215 with the pressure differential 295 becoming zero as bounded against expansion by the cover 235, the aperture 260 slits 265 will be normally urged into the closed 325 state, minimizing ingress of external environment 35 moisture into the interior 90.

CONCLUSION

Accordingly, the present invention of a self contained heat transfer reduction apparatus 30, 31, or 32 has been described with some degree of particularity directed to these embodiments of the present invention. It should be appreciated, though, that the present invention is defined by the following claims construed in light of the prior art so modifications of the changes may be made to the exemplary embodiments of the present invention without departing from the inventive concepts contained therein.

The invention claimed is:

1. A heat transfer reduction apparatus for an article, with the article having a unique convoluted exterior surface, comprising:
   (a) a first flexible surrounding sidewall including a first base, and an oppositely disposed first closure, further said first surrounding sidewall includes a first sidewall periphery and a perpendicularly oriented first distance as between said first base and said first closure, said first sidewall further comprises a plurality of apertures therethrough, wherein said first sidewall, said first base, and said first closure all act to define a first interior, wherein a portion of said first surrounding sidewall is in contact with a first portion of the exterior surface of the article;
   (b) a second flexible surrounding sidewall including a second base, and an oppositely disposed second closure, further said second surrounding sidewall includes a second sidewall periphery and a perpendicularly oriented second distance as between said second base and said second closure, said second sidewall further comprises a plurality of apertures therethrough, wherein said second sidewall, said second base, and said second closure all act to define a second interior, wherein a portion of said second surrounding sidewall is in contact with a second portion of the exterior surface of the article;
   (c) a moldable insulating material disposed within said first interior and said second interior via said first closure and said second closure respectively, wherein said first surrounding sidewall and said second surrounding sidewall form a separable clamshell interface arrangement to one another about the article exterior surface which includes the first and second portions of the exterior surface of the article, wherein said first surrounding sidewall and said second surrounding sidewall with said moldable insulating material substantially conforming in a custom manner about the article unique convoluted exterior surface, wherein said first surrounding sidewall and said second surrounding sidewall plurality of apertures are operational to allow the passage of air therethrough said first surrounding sidewall and said second surrounding sidewall to further allow said moldable insulating material to substantially fill said first and second interiors; and
   (d) a means for removably retaining said first surrounding sidewall and said second surrounding sidewall to one another in said clamshell arrangement about the article exterior surface.

2. A heat transfer reduction apparatus for an article according to claim 1 wherein said plurality of apertures are each in the shape of a slit.

3. A heat transfer reduction apparatus for an article according to claim 2 wherein said slit is formed via a sharp ended knife, wherein said slit has a length and a pair of opposed adjacent margin edges that are at said length, wherein said margin edges have a thickness equal to a thickness of said first and second surrounding sidewalls, said margin edges are normally urged into a closed state with said margin edges being substantially adjacent to one another and yieldable into an open state when said slit is exposed to a pressure differential between said first and second interiors and an external environment, wherein said open state occurs when said margin edges are separated from one another allowing air flow therethrough.

4. A heat transfer reduction apparatus for an article according to claim 3 wherein said length is size limited such that when said first and second surrounding sidewalls have a pressure within said first and second interiors greater than the external environment from said moldable insulating material being disposed within and expanding within said first interior and said second interior such that said opposed margin edges in said open state are separated by no more than about seventy five-thousandths (0.075) of an inch, being operational to limit seeping of said moldable insulating material therethrough said slits.

5. A heat transfer reduction apparatus for an article according to claim 4 wherein said plurality of slits has a per unit area density in said first and second surrounding sidewalls defined by each said slit length summed together to form a total dimensional number in said area, with said area defined as being a product number of said first periphery multiplied by said first distance or said second periphery multiplied by said second distance, wherein said total dimensional number is at least two (2) times said product number.

6. A heat transfer reduction apparatus for an article according to claim 5 wherein said moldable insulating material is constructed of a polyurethane intermediate.

7. A heat transfer reduction apparatus for an article according to claim 6 wherein said polyurethane intermediate is constructed from a polymeric, a polyols, and a hydrocarbon gas mixture.

8. A heat transfer reduction apparatus for an article according to claim 5 wherein said moldable insulating material is constructed of a two part polyurethane mix.

9. A heat transfer reduction apparatus for an article according to claim 1 wherein said means for removably retaining said first surrounding sidewall and said second surrounding sidewall is a removably engagable flexible outer cover that substantially encloses said first and second surrounding sidewall portions that are not a part of said clamshell interface.

10. A heat transfer reduction apparatus for an article according to claim 1 further comprising a flexible radiant barrier material layer affixed to a portion of said clamshell interface of each of said first and second surrounding sidewalls.

11. A heat transfer reduction apparatus for an article according to claim 10 wherein said flexible radiant barrier is constructed of a foil material adjacent to the article exterior surface with an adhesive sided high density foam layer positioned therebetween said foil and said clamshell interface of each of said first and second surrounding sidewalls.

12. A heat transfer reduction apparatus for an article according to claim 1 wherein said clamshell interface further comprises a means for sealing in-between said first and second surrounding sidewalls at said clamshell interface.

13. A heat transfer reduction apparatus for an article according to claim 12 wherein said means for sealing in-between said first and second surrounding sidewalls at said clamshell interface is a removably engagable labyrinth seal.

14. A heat transfer reduction apparatus for an article extending from a panel, with the article having a unique convoluted exterior surface, comprising:
   (a) a flexible surrounding sidewall including a primary base and an oppositely disposed secondary base with a longitudinal axis spanning therebetween, wherein said sidewall, said primary base, and said secondary base all act to define an interior, said sidewall further including a plurality aperture slits therethrough, wherein a portion of said surrounding sidewall is in contact with a portion of the exterior surface of the article;

(b) a moldable insulating material disposed within said interior, wherein said surrounding sidewall is formed into an inverted "U" configuration along said longitudinal axis resulting in a separable clamshell interface arrangement about the article exterior surface, wherein said surrounding sidewall with said moldable insulating material substantially conforming in a custom manner about the article unique convoluted exterior surface, wherein said plurality of aperture slits are operable to vent excess air in an open state from said interior to an external environment to allow said moldable insulating material to substantially fill said interior and substantially conform to the article unique convoluted exterior surface in said inverted "U" configuration; and (c) a means for removably retaining said surrounding sidewall in said clamshell arrangement about the article exterior surface.

15. A heat transfer reduction apparatus for an article according to claim 14 wherein each of said plurality of aperture slits is normally urged into a substantially closed state and yieldable into said open state when each aperture slit is exposed to an air flow caused by a pressure difference as between said interior and the external environment, wherein said aperture slit is urged to return to said closed state at a termination of said pressure difference, being operational to assist in the prevention of an ingress of moisture from the external environment to said interior.

16. A heat transfer reduction apparatus for an article according to claim 15 wherein each said aperture slit includes margin edges that are oppositely positioned being opposed to one another and urged substantially adjacent to one another in said closed state, wherein when said aperture slit is exposed to said pressure difference, said margin edges are urged apart from one another to define a discharge passage placing said aperture slit into said open state allowing air to flow therethrough.

17. A heat transfer reduction apparatus for an article according to claim 16 wherein said moldable insulating material is constructed of a fiberglass wool.

18. A heat transfer reduction apparatus for an article according to claim 16 wherein said means for removably retaining said surrounding sidewall in said clamshell arrangement is a removably engagable flexible outer cover that substantially encloses said surrounding sidewall that is not a part of said clamshell interface.

19. A heat transfer reduction apparatus for an article according to claim 16 further comprising a flexible radiant barrier material layer affixed to a portion of said clamshell interface of said surrounding sidewall.

20. A heat transfer reduction apparatus for an article according to claim 19 wherein said flexible radiant barrier is constructed of a foil material adjacent to the article exterior surface with an adhesive sided high density foam layer positioned therebetween said foil and said clamshell interface of said surrounding sidewall.

21. A heat transfer reduction apparatus for an article according to claim 18 wherein said clamshell interface further comprises a means for sealing in-between said clamshell interface and a means for sealing in-between said cover and the panel.

22. A heat transfer reduction apparatus for an article according to claim 21 wherein said means for sealing in-between said clamshell interface and said means for sealing in-between said cover and the panel are both in the form of a removably engagable labyrinth seal.

23. A method of installing a self contained heat transfer reduction apparatus about an article, with the article having a unique convoluted exterior surface, comprising the steps of:

(a) providing a self contained heat transfer reduction apparatus that includes a first flexible surrounding sidewall including a first base, and an oppositely disposed first closure, further said first surrounding sidewall includes a first sidewall periphery and a perpendicularly oriented first distance as between said first base and said first closure, wherein said first sidewall, said first base, and said first closure all act to define a first interior, further included is a second flexible surrounding sidewall including a second base, and an oppositely disposed second closure, further said second surrounding sidewall includes a second sidewall periphery and a perpendicularly oriented second distance as between said second base and said second closure, wherein said second sidewall, said second base, and said second closure all act to define a second interior, said first and second surrounding sidewalls further include a plurality of slit apertures therethrough, wherein each slit has a length and a pair of opposed adjacent margin edges along said slit, wherein said margins are normally urged into a closed state with said margin edges being substantially adjacent to one another and yieldable into an open state when said slit is exposed to a pressure differential between said first and second interiors and an external environment, wherein said open state occurs when said margin edges are separated from one another allowing air flow therethrough, further included is a moldable insulating material, and a means for removably retaining said first surrounding sidewall and said second surrounding sidewall to one another in the form of a removably engagable flexible outer cover that substantially encloses said first and second surrounding sidewalls;

(b) positioning said flexible outer cover around the article exterior surface leaving open space as between the article exterior surface and said cover, wherein said cover forms an open ended enclosure about the article exterior surface;

(c) placing said first surrounding sidewall into said flexible outer cover with said first base feeding through said open ended enclosure until said first surrounding sidewall is disposed within a portion of said open space;

(d) placing said second surrounding sidewall into said flexible outer cover with said second base feeding through said open ended enclosure until said second surrounding sidewall is disposed within a remaining portion of said open space that is not occupied by said first surrounding sidewall;

(e) positioning said first and second flexible surrounding sidewalls to be adjacent to one another, said flexible outer cover, and the article exterior surface, wherein said first and second closures are in an open state; and (f) disposing said moldable insulating material within said first interior and said second interior via said first closure and said second closure respectively, wherein said first surrounding sidewall and said second surrounding sidewall form a separable clamshell interface arrangement to one another about the article exterior surface, wherein said first surrounding sidewall and said second surrounding sidewall with said moldable insulating material substantially expanding and conforming in a custom manner about the article unique convoluted exterior surface, wherein said plurality of slits allowing air venting from said first and second interiors to the external environment further allows said moldable insulating material to substantially fill said first and second interiors to minimize any air voids disposed about the article exterior surface and elsewhere within said cover.

24. A method of installing a self contained heat transfer reduction apparatus about an article that extends from a panel, with the article having a unique convoluted exterior surface, comprising the steps of:

(a) providing a self contained heat transfer reduction apparatus that includes a flexible surrounding sidewall having a primary base and an oppositely disposed secondary base, with a longitudinal axis spanning therebetween, wherein said sidewall, said primary base, and said secondary base all act to define an interior, wherein a portion of said sidewall is in contact with a portion of the exterior surface of the article, said sidewall further including a plurality of aperture slits therethrough, wherein each slit has a length and a pair of opposed adjacent margin edges along said slit length, wherein said margins are normally urged into a closed state with said margin edges being substantially adjacent to one another and yieldable into an open state when said slit is exposed to a pressure differential between said interior and an external environment, wherein said open state occurs when said margin edges are separated from one another allowing air flow therethrough, wherein a portion of said surrounding sidewall is in contact with a portion of the exterior surface of the article, further included is a moldable insulating material that is disposed within said interior, and a cover for removably retaining said surrounding sidewall in an inverted "U" configuration having a clam shell interface about the article exterior surface;

(b) positioning a portion of said cover in contact with the panel and placing a remaining portion of said cover around the article exterior surface leaving an open space as between the article exterior surface and said cover, wherein said cover forms a selectably open ended enclosure about the article exterior surface;

(c) placing a portion of said sidewall into a portion of said cover open space such that said primary base of said surrounding sidewall feeds into said portion of said cover open space through said open ended enclosure with said primary base feeding through said open ended enclosure until said primary base contacts a fraction of said cover portion contacting the panel, wherein a portion of said sidewall is disposed within said cover open space portion and a portion of said sidewall freely protrudes outside of said cover open space portion;

(d) folding said freely protruding sidewall portion into a remaining portion of said cover open space such that said secondary base is placed through said open ended enclosure with said secondary base feeding through said remaining cover open space portion until said secondary base contacts a remaining fraction of said cover portion contacting the panel, resulting in said sidewall having an inverted "U" shape along said longitudinal axis, wherein said folding step causes a pressure differential as between said interior and the external environment facilitating air to vent from said interior to the external environment via said plurality of aperture slits further enabling a compression of said moldable insulating material within said interior caused by said folding step; and (e) positioning said sidewall to encase the article exterior surface and to substantially fill said cover open space, wherein said insulation material will expand and cause a pressure differential as between said interior and the external environment facilitating air to vent from the external environment to said interior via said plurality of aperture slits further enabling an expansion of said insulating material within said cover open space, wherein when said insulating material ceases to expand with said pressure differential becoming zero as bounded by said cover, said aperture slits will be normally urged into said closed state, minimizing ingress of external environment moisture into said interior.

* * * * *